May 24, 1960    G. C. BARTON    2,937,388
MACHINES FOR TRIMMING AND SKIVING HEEL BREAST COVERING FLAPS
Filed Aug. 23, 1957    9 Sheets-Sheet 1

*Inventor*
George C. Barton
By his Attorney

Inventor
George C. Barton
By his Attorney

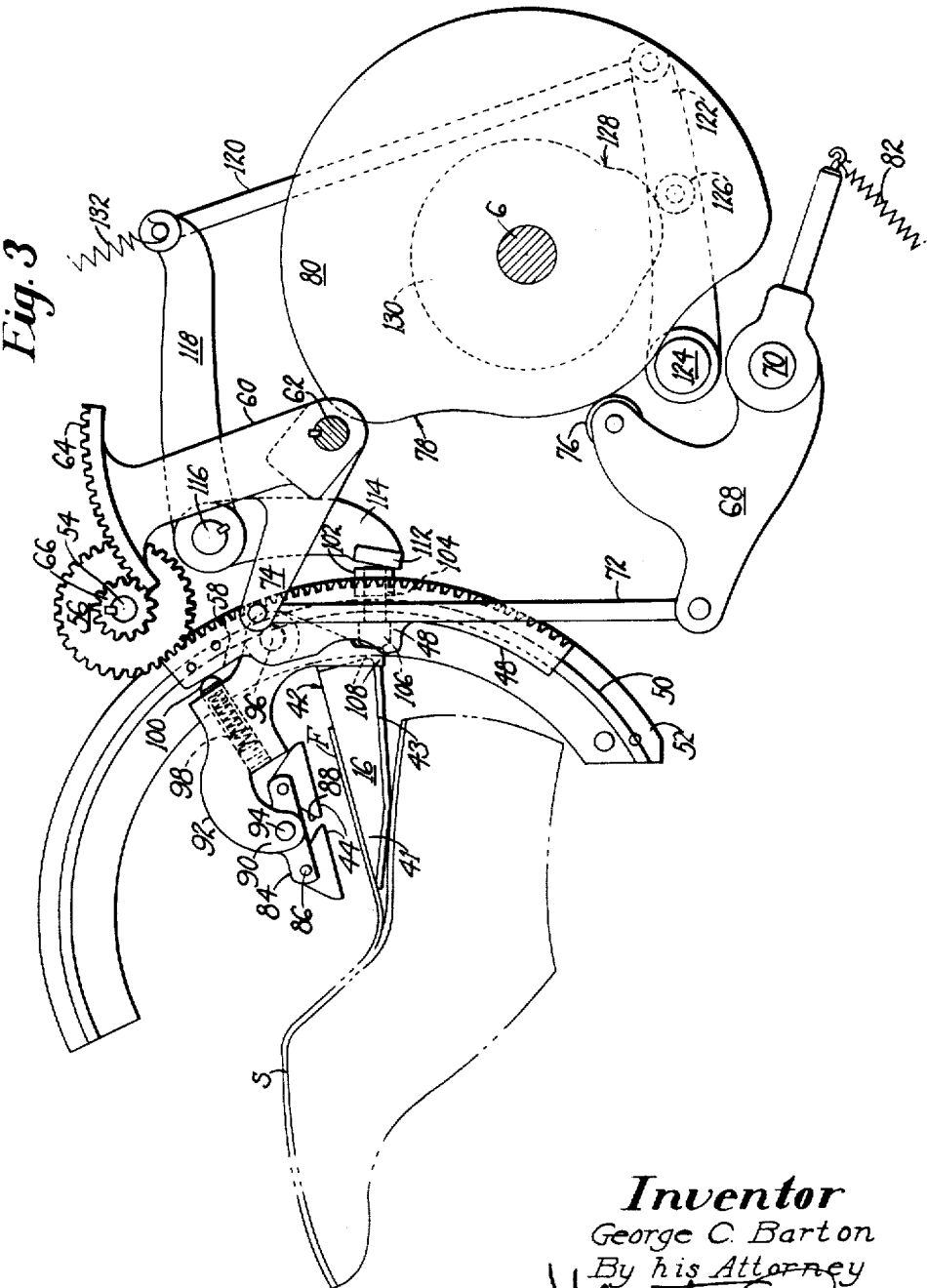

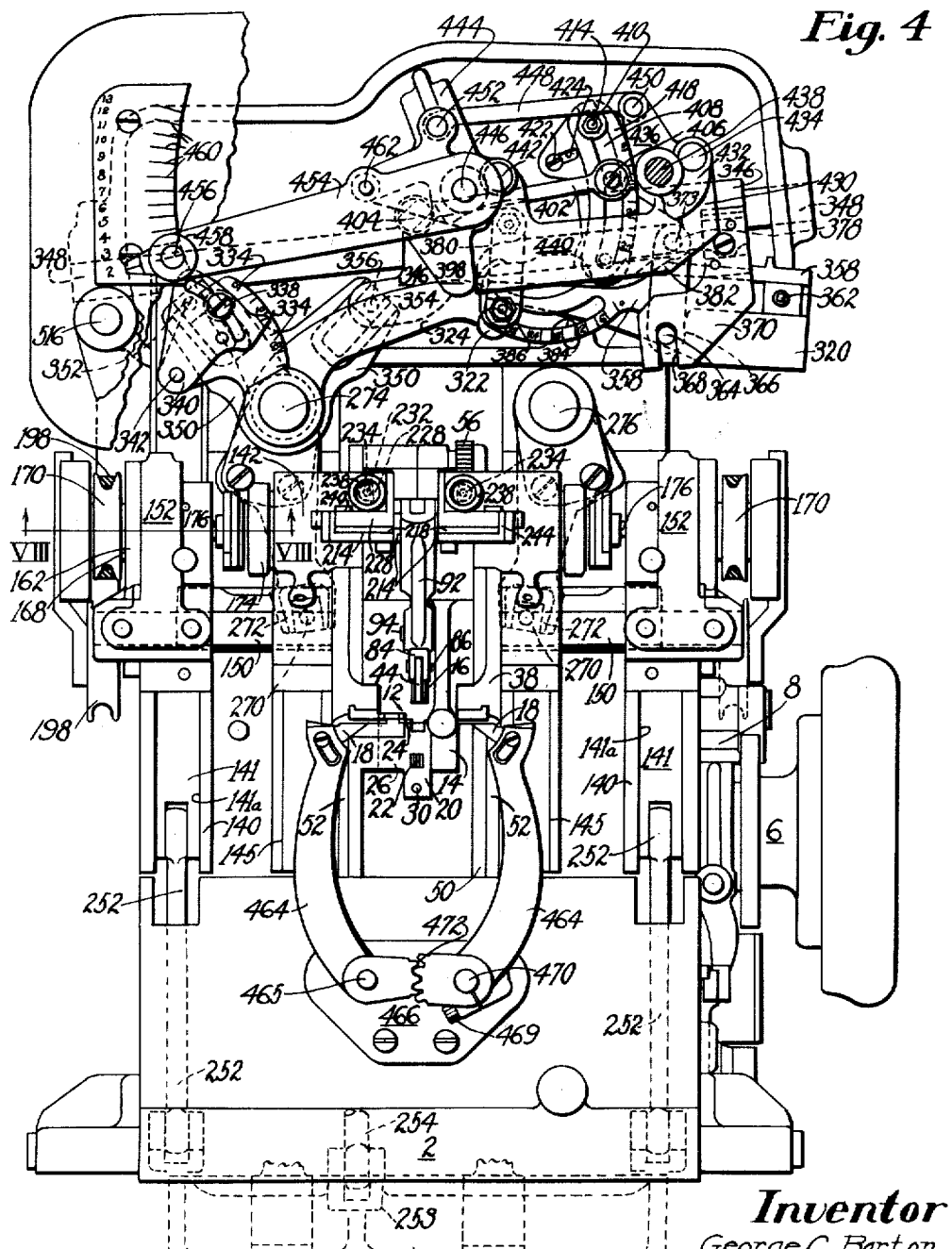

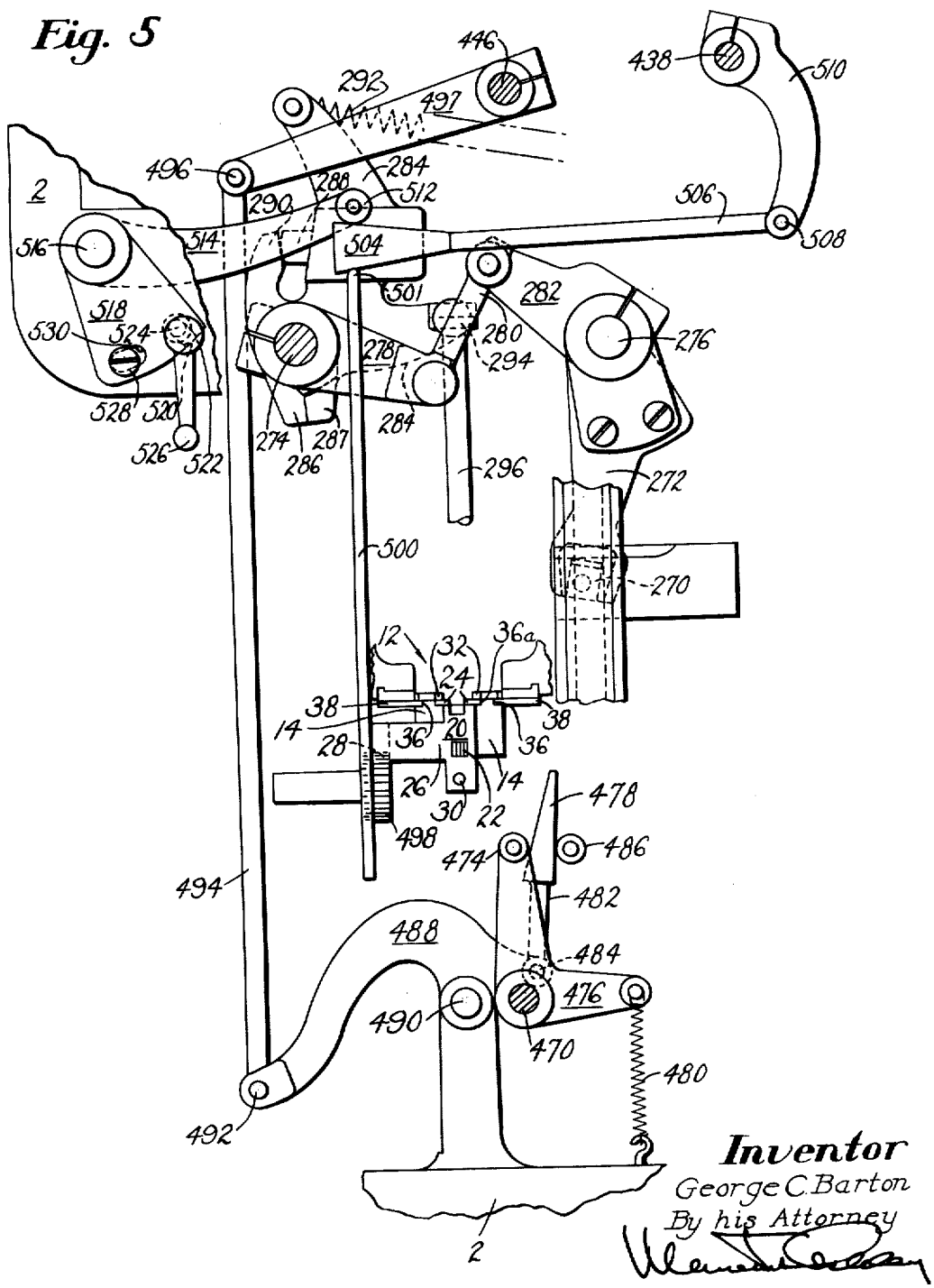

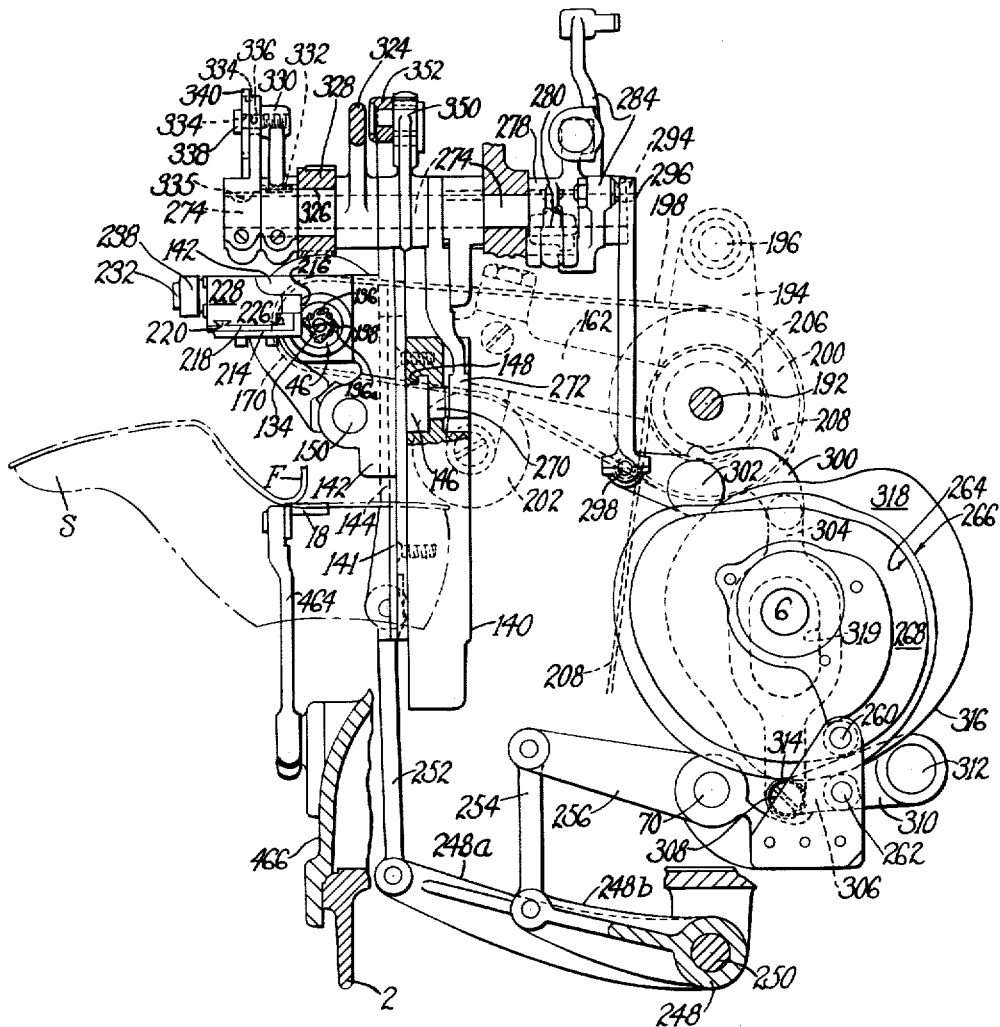

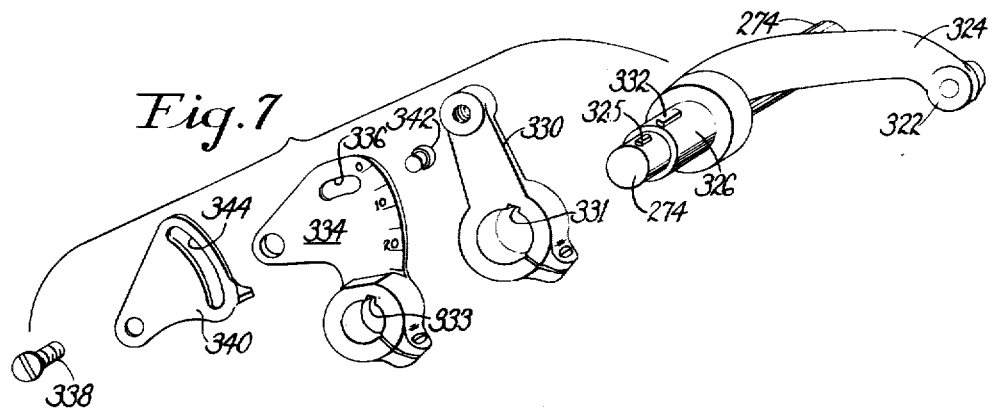
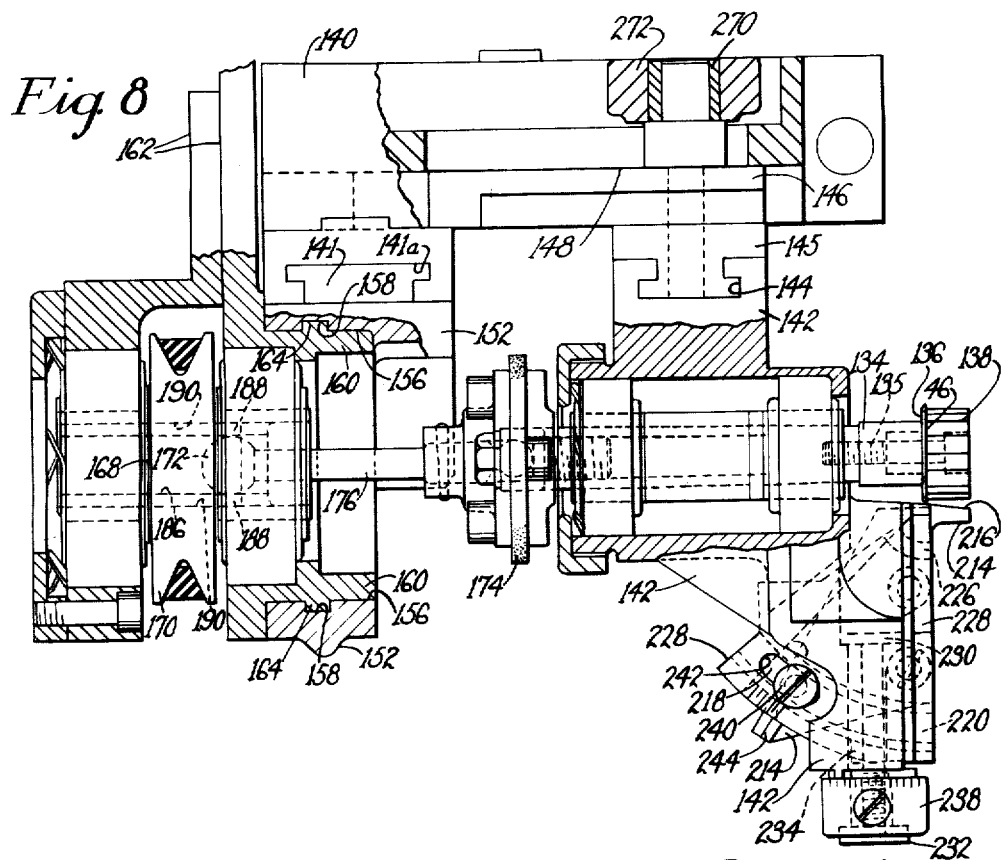

May 24, 1960 G. C. BARTON 2,937,388
MACHINES FOR TRIMMING AND SKIVING HEEL BREAST COVERING FLAPS
Filed Aug. 23, 1957 9 Sheets-Sheet 8
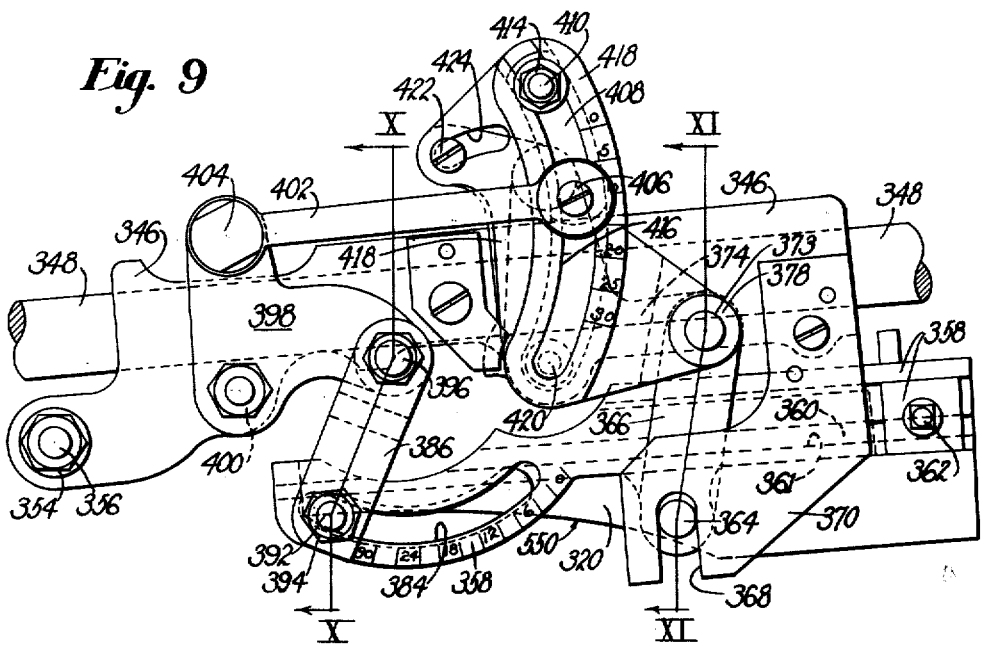
Fig. 9
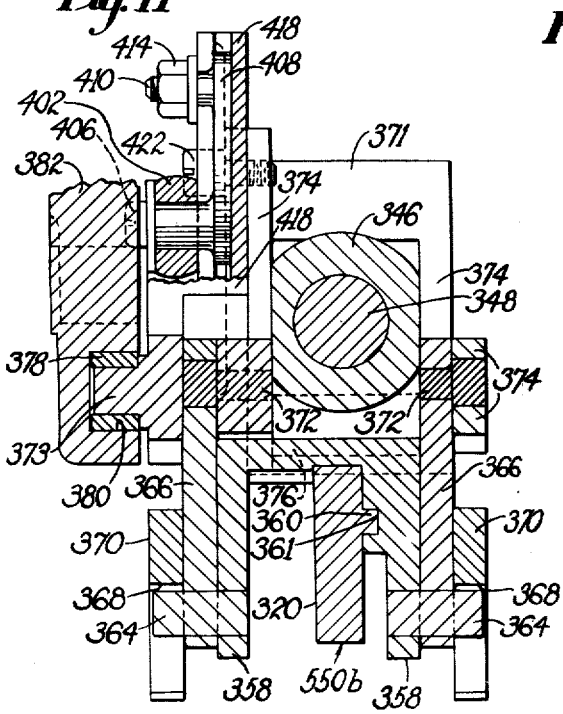
Fig. 11
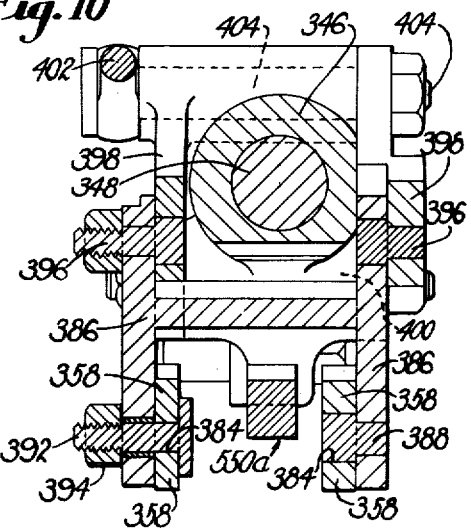
Fig. 10
*Inventor*
George C. Barton
By his Attorney

United States Patent Office 2,937,388
Patented May 24, 1960

2,937,388

MACHINES FOR TRIMMING AND SKIVING HEEL BREAST COVERING FLAPS

George Clifford Barton, Leicester, England, assignor to United Shoe Machinery Corporation, Flemington, N.J., and Boston, Mass., a corporation of New Jersey Filed Aug. 23, 1957, Ser. No. 679,846

Claims priority, application Great Britain Aug. 31, 1956

26 Claims. (Cl. 12—16.2)

This invention relates to machines for trimming and skiving flaps, which have been split from the rear end portions of attached outsoles of shoes, to prepare them for attachment to the breasts of Louis heels subsequently attached to the shoes. The flaps, which are commonly referred to as Louis heel flaps, must be trimmed to the proper outline so when laid upon the breasts of the heels they shall be flush with the breast edges of said heels. Moreover in order to improve the appearance of the heels it is desirable and it is common practice to skive material from the lateral margins of the flesh or inner face of the flap so that said margins shall be extremely thin.

The manual trimming and skiving of the heel breast covering flaps requires the services of a highly skilled operator and accordingly is expensive. The problem of obtaining a cheap and efficient trim and skive on a heel breast covering flap was recognized in the development of a machine disclosed in United States Letters Patent No. 2,692,999, granted November 2, 1954, on an application filed in the names of George Hazelton et al. The machine described in the above-mentioned patent is provided with adjustment and gaging means enabling it to trim and skive a flap to suit any Louis heel of normal size and shape. Thus, when two successive heels in a range of heels of the same style, but of different sizes, differ in width by a uniform increment from the top to the bottom of the heel, the machine disclosed in said Patent No. 2,692,999 will operate correctly on flaps for either of these heels, if the heels have been engaged by heel engaging means of the machine and also provided that adjustments have been made correctly for a particular heel of that range of heels. However, as is sometimes the case, where two successive heels in a range of heels of the same style but of different sizes differ in width by an increment which diminishes uniformly from top to bottom of the heel, the machine disclosed in said patent may be expected to operate correctly on the flap of one heel only, and further adjustments additional to those already mentioned will have to be made to the machine before it will operate as required on the flap for the second heel. These adjustments require a certain measure of skill on the part of an operator.

From the foregoing it will be understood that the machine disclosed in Patent No. 2,692,999 although generally satisfactory requires a certain measure of skill on the part of the operator. Further the machine is provided with three treadles which have to be actuated at different times during the operation of the machine, and also the operator must manually support a shoe in the correct position as its Louis heel flap is being operated upon. Accordingly, the use of the machine requires considerable physical and mental effort on the part of the operator and has a tendency to tire the operator.

It is one object of the present invention to provide an automatic machine having the advantages of the machine disclosed in said Patent No. 2,692,999 but adapted to prepare more satisfactorily than that machine, heel breast covering flaps which will fit the breasts of Louis heels of shoes of a wide variety of styles and/or sizes. It is also an object of the invention to provide an improved machine the control and adjustment of which shall be relatively easy and convenient for an operator.

With the above and other objects and considerations in view the hereinafter described illustrative machine, in accordance with one feature of the invention, is provided with shoe positioning means comprising adjustable gages for engaging the sides of a shoe, seat stops adapted to engage the heel seat of the shoe, an end stop or back gage for engaging the rear end of the shoe and a centralizer for engaging the heel or rear end portion of the shoe, said shoe positioning means serving accurately to position the shoe in the machine.

The illustrative machine is also provided with a flap support and an associated clamp, the machine being so constructed and arranged that when the shoe is correctly positioned in the machine the heel breast covering flap is properly positioned on the support ready to be secured to said support by the clamp. When a one-revolution clutch of the illustrative machine is tripped the flap is clamped against the support and, in accordance with another feature of the invention, power means is provided for moving the support and the clamp to a presenting or upright position disposed at approximately right angles to the heel seat of the shoe preparatory to trimming and skiving the flap.

For trimming and skiving the flap the illustrative machine is provided with means comprising a pair of compound cutters each of which comprises a trimming cutter and a skiving cutter. In accordance with a further feature of the invention power mechanism, which is operative in timed relation with the above-mentioned support and clamp operating means, is provided for moving the compound cutters lengthwise along the opposite lateral margins of the flap progressively from its top lift and to its root, lip or base portion whereby simultaneously to trim to the proper outline the lateral margins of the flap and to skive the flesh face of said margins.

Flaps of Louis heels usually diminish in width from their base ends to their outer ends. Accordingly, it will be understood that as the compound cutters of the illustrative machine are moved generally lengthwise along the flap toward its base end to perform the trimming and skiving operations, they should be caused to move away from each other so as to take account of the increasing width to be imparted to the flap. To achieve this movement of the compound cutters the illustrative machine is provided with mechanism comprising a movable and replaceable cam having a surface, face, or track so constructed and arranged that during the operation of the machine the cam surface controls the movement of the compound cutters toward and away from each other as they move generally lengthwise of the flap so that a Louis heel flap may be accurately trimmed and skived.

For different sizes of shoes different size heels are required and thus the Louis heel flaps will vary in size in accordance with the size of the heel and the shoe. For larger heels wider flaps are required than for small heels and the hereinafter described machine is provided with means for setting the position of the compound cutters so that a flap of any normal required size can be trimmed and skived to suit the heel for which it is intended. The cam constituting part of the above-mentioned mechanism is mounted on a power operated carriage movable in a fixed path, means being provided, in accordance with a further feature of the invention, to orient the cam upon the carriage by tilting, translatory, or proportionately selective combined tilting and translatory adjustments of the cam on said carriage whereby to locate said cam in a great number of operating positions upon the carriage and thus produce the proper movement of the compound cutters toward and away from each other, as the cutters travel generally lengthwise of the flap, to trim flaps for a wide variety of sizes and styles of heels with the use of a minimum number of cams.

For normal work the compound cutters of the illustrative machine may be set so that when two successive flaps of different sizes are to be operated upon, the larger of the flaps will be trimmed and skived with a uniform increased increment in width along the sides of the flap compared with the trimming and skiving of the smaller flap. As, however, in some styles of heels the increment in width of a larger heel, as compared with a smaller one, is substantial at the top of the heel and diminishes uniformly to the bottom of the heel, the illustrative machine is provided with cam bias means comprising a manually operated lever which may be moved over a graduated scale so as to take account of the diminishment of the increment in width of a larger heel as compared with a smaller heel. The bias means are arranged on actuation to move the cam about a pivot point which movement causes the compound cutters when operating on a flap to trim and skive the flap so that any diminishment in the width of the heel to which the flap is to be secured is allowed for so as to suit the flap to that heel. Movement of the bias means is so regulated in the illustrative machine that the cam may be moved about the pivot point to assume different angular positions with respect to the pivot according to the degree of diminishment of the width of the heel from the top to the bottom thereof, whereby it is contrived that the compound cutters may be arranged so that the flaps for any normal Louis heels may be easily and quickly trimmed and skived, notwithstanding that the heels may be of different sizes and/or styles.

The illustrative machine, in accordance with another feature of the invention, is provided with means operatively connecting the compound cutter setting mechanism to the shoe positioning means thus insuring that when an operator regulates the cutter setting mechanism so that the cutters are caused to move a required distance apart for operating upon a flap of a certain size of heel, so also are the shoe positioning means caused to move, so as to be in a position for accommodating a shoe of a size suitable for the heel for which the flap is to be trimmed and skived.

From the foregoing it will be understood that the illustrative machine has several advantages as compared with the machine disclosed in said Patent 2,692,999 in that by virtue of its ease of operation a shoe may be quickly positioned, and the flap firmly held with the shoe in a fixed position so that the compound cutters may be moved relatively to the flap so as to impart an accurate trim and skive. Further, when it is desired to change from a shoe of one size to a shoe of another size, a simple movement of the lever regulating the cutter controlling mechanism and the shoe positioning means will accommodate the machine to receive and operate on the shoe of different size, and a quick and simple movement of the bias means will accommodate the machine to operate on a shoe with a heel of different style to that previously operated upon.

The present invention consists in the above novel features and in novel features hereinafter described, reference being had to the accompanying drawings which illustrate one embodiment of the invention selected for purposes of illustration, said invention being fully disclosed in the following description and claims.

In the drawings,

Fig. 3 is a view similar to Fig. 2 showing the flap holding mechanism, which constitutes a support and clamp, in an idle position ready to be rotated into the position shown in Fig. 2;

Fig. 4 is an enlarged view of an upper portion or operating head of the machine certain parts of which have been broken away and other parts of which have been removed;

Fig. 5 shows in front elevation, partly broken away, portions of the shoe positioning mechanism and portions of mechanism for moving in predetermined paths compound trimming or skiving cutters and for initially adjusting the setting thereof in accordance with the desired paths of movement of said cutters;

Fig. 6 is a longitudinal, vertical section, partly broken away, showing mechanism for rotating the cutters and for moving them bodily lengthwise and widthwise of the heel breast covering flap shown in Fig. 2 to trim the flaps to a predetermined outline and to skive material from the positioned lateral edges of the flesh side of said flap;

Fig. 7 is an exploded view showing in perspective portions of the cutter operating mechanism illustrated at the upper end portion of Fig. 6;

Fig. 8 is a plan view, partly in section on the line VIII—VIII of Fig. 4, showing mechanism for rotating the left compound cutter, and also showing flap supporting means associated with said cutter;

Fig. 9 is a front view of mechanism comprising a cam adapted to control movement of the compound cutters toward and away from one another as they move generally lengthwise of the heel breast covering flap shown in Fig. 2;

Figs. 10 and 11 are sections on the lines X—X, XI—XI, respectively of Fig. 9.

The illustrative machine is described with reference to trimming a heel breast covering flap F (Figs. 2, 3 and 6), which has been split from an outsole of a shoe S, to a predetermined outline to fit the breast of a heel (not shown) to be attached to the shoe and also with reference to skiving material from the flesh or inner face along the lateral margins of the flap so that the lateral edges of said flap shall not be noticeable after the flap has been applied to the breast of the heel.

Figure 1:
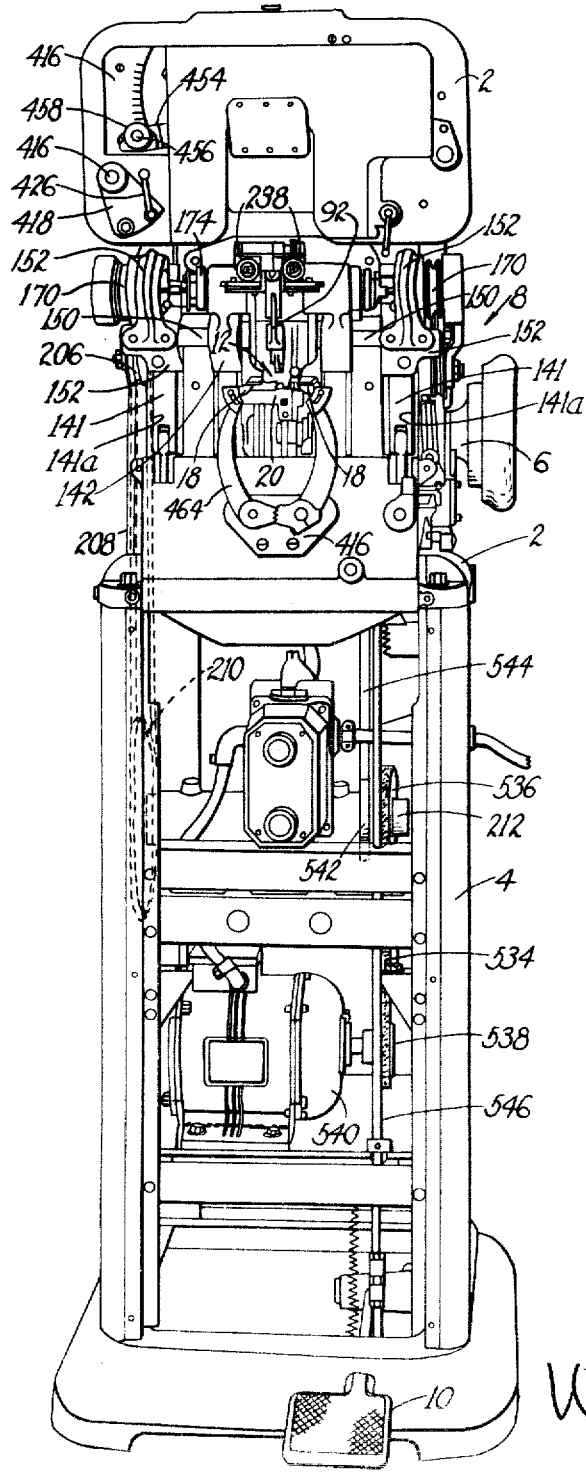
Fig. 1 is a front view of the illustrative machine.

The illustrative machine has a frame 2 mounted on a column 4 (Fig. 1) and a main shaft 6 which is journaled in the lower part of the frame and is driven in a manner hereinafter described through a single revolution clutch 8, the construction and arrangement being such that the main shaft 6 makes a single revolution when a treadle 10 is depressed by the operator.

Mounted in the front portion of the machine in a manner hereinafter described are a shoe engaging member or seat stop 12 (Figs. 1, 2, 4 and 5), a movable flap support 16, a pair of side gages 18 and an end stop or back gage 20 all adapted to engage parts of the shoe S presented to them by an operator. The end stop 20 is forwardly and upwardly inclined and has a lateral extension 26 formed on a rack 28 slidable in the frame 2 for forward and rearward adjustment by means hereinafter described. At the head of the end stop 20 are a pair of laterally extending flanges 24 and mounted in a recess in the end stop is a leaf spring 22 the lower end of which is secured to the end stop by a screw 30.

The shoe engaging member 12 which is slidingly mounted on the end stop 20 comprises seat stops 32 and a V-shaped centralizer or gage 14 for centralizing the heel end of the shoe widthwise, the seat stops 32 comprising a pair of horizontal plates arranged above the V-shaped centralizer 14. Outer and inner longitudinal channels 36, 36a (Fig. 5) are formed in the inner and outer sides of the shoe engaging member 12 between the seat stops 32 and the centralizer 14, the outer channels 36 forming guideways for receiving members or guide brackets 38 which are fixed to the frame 2 and serve to support said member 12 while allowing forward and rearward movements thereof. The inner channels 36a form guideways which are engaged by the aforesaid laterally extending flanges 24. The upper end of the spring 22 bears against a pin 40 (Fig. 2) mounted laterally in the rear of the shoe engaging member 12 a rearward extending portion of which surrounds the rearward portion of the stop and thus forward movement of the shoe engaging member 12 under the action of the spring 22 being limited by contact of the pin with the end stop 20.

The shoe to be operated upon is presented upside down and heel end first to the machine, the heel seat of the shoe being pressed upwardly against the seat stops 32 while the side gages 18 engage portions of the shoe lying at either side of the heel seat and serving to prevent the shoe from being displaced laterally. The shoe is also pressed rearwardly until its heel end engages the centralizer 14 which by virtue of its V shape insures that the heightwise median plane of the heel seat of the shoe shall extend forward and rearward of the machine. The shoe is then pressed further rearwardly causing the shoe engaging member 12 to slide rearwardly against the action of the spring 22 until the heel end of the shoe finally engages the end stop 20 thus insuring that the shoe shall be correctly positioned lengthwise in the machine. It will be apparent that the side gages 18, the seat stops 32, the end stop 20 and the centralizer 14 cooperate to insure the accurate placing of the shoe in the desired position in the machine.

At the same time that the shoe is positioned in engagement with the shoe engaging member or seat stop 12, the side gages 18 and the end stop 20, the flap F of the outsole of the shoe is presented to the flap support 16 which comprises a downwardly extending tapered web 41 (Figs. 2 and 3) and a stiffening flange 43 having a straight or flat narrow flange engaging face 42 which extends widthwise and lengthwise of the machine and is adapted to enter between the heel seat and the flap F of the shoe so that said flap lies on said face. Two clamps 44 mounted in a manner hereinafter described are adapted to clamp the flap F to the face 42 of the flap support 16 while the flap is subject to the action of a pair of compound cutters 46 (only one shown) hereinafter described. The flap support 16 extends radially from an arcuate support slide 48 (Fig. 3) of composite construction provided at either side with an arcuate guideway, the guideways engaging respectively complementary arcuate guides 50 formed in a pair of support plates 52 secured to the frame 2. The clamps 44 may be collectively referred to as a clamp and the clamp and the support 16 may be collectively referred to as a holder. The support 16 and the clamps 44 may be described as being movable between retracted or flap receiving positions shown in Fig. 3 and projected or flap presenting positions shown in Fig. 2.

Figure 2:
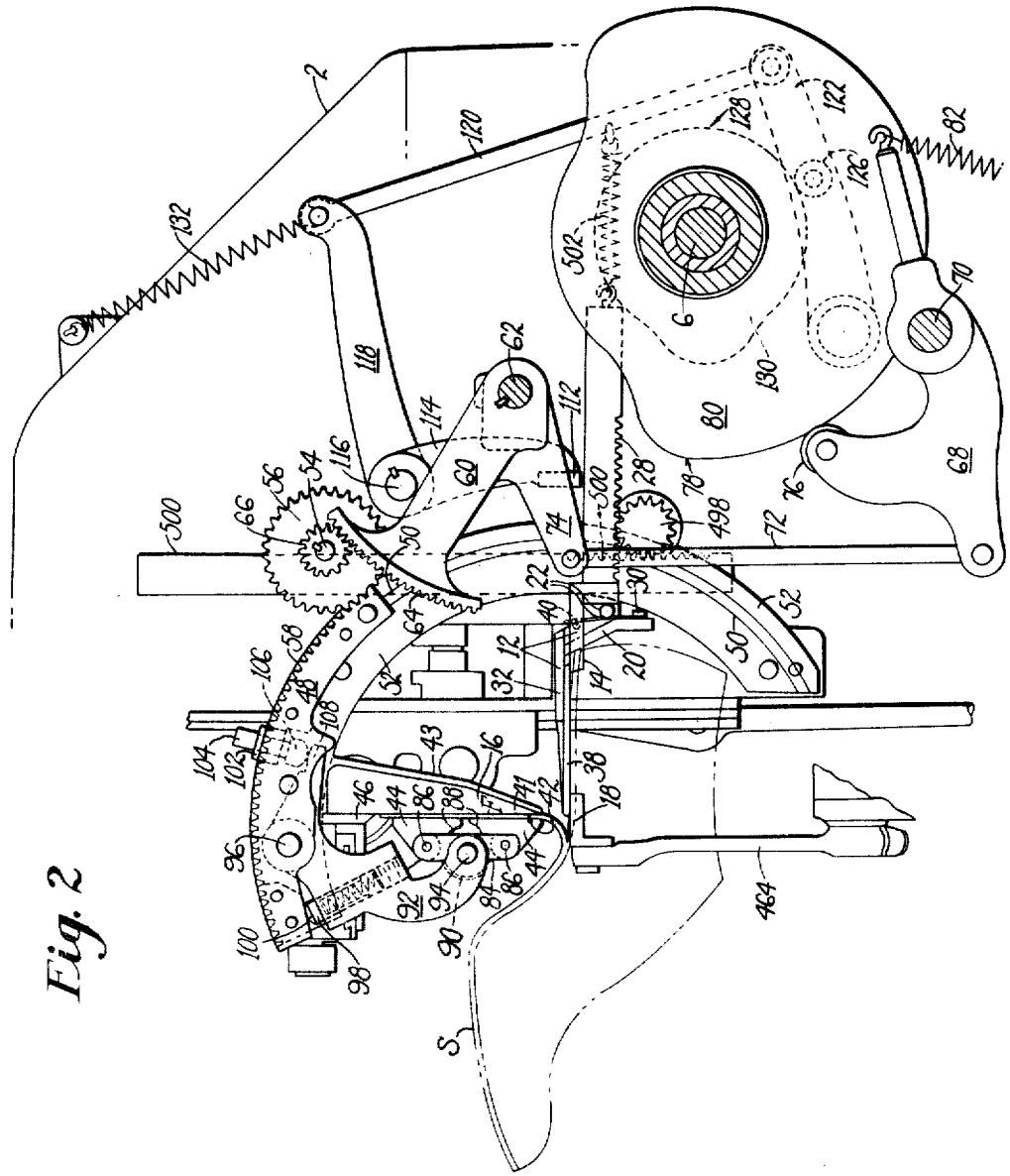
Fig. 2 shows in side elevation positioning mechanism for a shoe and mechanism for holding a heel breast covering flap of the shoe in a vertical position ready to be trimmed and skived.

The free end of the flap support 16 lies near the center of curvature of the arcuate guides 50, the construction and arrangement being such that the support slide 48 sliding on the guides of the support plates 52 may swing the flap support 16 from a substantially horizontal position (Fig. 3) until the engaging face 42 lies substantially vertically as seen in Fig. 2. The swinging of the flap support 16 causes a flap placed against the face 42, when the flap support is in a substantially horizontal position and is held against said face by the clamps 44, to be bent at the root until it is situated in a substantially vertical position and substantially perpendicular to the heel seat of the shoe which is engaged by the shoe engaging member 12 and the end stop 20. The flap support 16 and the clamps 44 may be collectively referred to as a holder.

Arcuate movement is imparted to the support slide 48 by a transverse shaft 54 which is journaled in the frame 2 and is fixed to a pinion 56 meshing with teeth 58 formed in the right side of the support slide 48. The terms "right or right-hand" and "left or left-hand" hereinafter used refer to the view of the operator as he faces the machine. The shaft 54 is rotated by rocking movement of an arm 60 which is fixed to a shaft 62 journaled in the frame 2 and is provided with teeth 64 meshing with a pinion 66 fixed to the shaft 54. Rocking movement is imparted to the arm 60 by a cam lever 68 pivoted between its ends on a shaft 70 fixed in the frame 2 and having a forward end portion pivotally connected by a link 72 to an arm 74 fixed to the shaft 62. A cam roll 76 rotatably mounted on an upward extension of the cam lever 68 is forced against an open cam face 78, which is formed on a cam 80 fixed to an intermediate portion of the main shaft 6, under the influence of a tension spring 82 attached to a rearward end portion of the cam lever 68 and to the column 4. As will be more fully explained, the cam face 78 acts through the cam roll 76, the cam lever 68, the link 72, the arm 74, the arm 60, the pinion 66 and the pinion 56 to swing the flap support 16 with its flap engaging face 42 upwardly from its rest position into a substantially vertical position, the flap support 16 being returned to its rest position by the action of the spring 82 when allowed to do so by said cam face.

The clamps 44 are rockably mounted on pivot pins 86 mounted at opposite ends of a clamp link 84. Faces 88 formed on the clamps 44 engage complementary faces (not shown) formed on the clamp link 84 to limit the extent to which the clamps can rock about their pivots 86. The clamp link 84 is embraced by the arms of a bifurcated portion 90 of a clamp lever 92 and is pivoted between its ends on a pin 94 fixed to this lever, the clamp lever being pivoted on a pin 96 fixed to the support slide 48. A spring plunger 98 housed in the clamp lever 92 engages an abutment 100 formed in the support slide 48 and thus urges the clamp 44 toward the flap support 16. The ability of the clamps 44 to rock slightly about the pivots 86 enables them to clamp a flap of varying thickness firmly against the face 42 under the action of the spring-pressed plunger 98.

Fixed radially in the support slide 48 is a boss 102 in which is slidably mounted a pin 104, a head 106 of the pin 104 being engaged by a tail portion 108 of the clamp lever 92 and being supported thereby in the boss. Forward movement imparted to the pin 104, when the support slide 48 is in its rest position, by an abutment 112 in a manner now to be described causes the pin to rock the clamp lever 92 about its pivot pin 96 against the resistance of the spring plunger 98, and thus moves the clamps 44 away from the clamp engaging face 42 of the flap support 16 to enable a flap to be inserted between the flap support and the clamps.

The abutment 112 is formed on the swinging end portion of a downwardly depending arm 114 the upper end portion of which is fixed to a transverse shaft 116 journaled in the frame 2. When the main shaft 6 is at rest the flap support 16 is in its lowered substantially horizontal rest position and the arm 114 is in a forward position, the abutment 112 pressing the pin 104 forwardly against the resistance of the spring plunger 98. At this time, therefore, the clamps 44 are spaced apart from the flap engaging face 42 to allow the operator to insert the flap between the clamps and the flap support ready for the machine to be operated. A rearwardly extending arm 118 also fixed to the shaft 116 is pivotally connected by a link 120 to the rearward end portion of a cam lever 122 the forward end portion of which is pivoted on a pin 124 fixed in the frame 2. A cam roll 126 rotatably mounted on an intermediate portion of the cam lever 122 is urged into engagement with a cam face 128, formed on a cam 130 secured to the left-hand portion of the main shaft 6, by a tension spring 132 opposite ends of which are anchored respectively to the arm 118 and to the frame 2.

As will be more fully explained, when the operator, by depressing the treadle 10, trips the one-revolution clutch 8 the main shaft 6 starts to rotate and the cam face 128 moves so as to allow the spring 132 to withdraw the abutment 112 rearwardly. This rearward movement of the abutment 112 allows the pin 104 to move rearwardly and permits the spring plunger 98 to press the clamps 44 against the flap F which has been inserted between the face 42 of the support 16 and the clamps 44. Thereafter the flap support 16, the clamps 44 and the clamped flap F swing upwardly into their operative position shown in Fig. 2 ready for the compound cutters 46 to trim and skive the clamped flap to a predetermined outline while it is supported in its fixed substantially vertical position, the trimming and skiving operation being unaffected by any movement of the shoe while this operation is taking place. When the compound cutters 46 have trimmed and skived the flap F from the tip of the root portion adjacent to the heel seat of the shoe S, the cutters move away from the flap as will be more fully explained and the flap support returns to its substantially horizontal position. After the flap support 16 has returned to its horizontal position and just before the main shaft 6 completes one revolution the cam face 128, operating through the mechanism above described, causes the abutment 112 to move forwardly and accordingly the clamps 44 to be lifted from the flap to allow the operator to remove the shoe from the machine.

Only the left compound cutter 46 is shown in the drawings, the construction and arrangement of the right-hand cutter being similar to but reversed from that of the left-hand cutter. The compound cutters 46 are secured by screws 135 (Fig. 8) to the inner end portions of coaxial rotating shafts 134 and are arranged to engage respectively opposite lateral portions of the flap F, each cutter 46 comprising a trimming cutter 136 (Figs. 6 and 8) which have cutting edges 136a and is adapted to trim an edge of the flap, and a skiving cutter 138 adapted to skive the adjacent margin of the flesh surface of the flap, said flesh surface being the surface of the flap which is adhesively secured to the breast of the heel. The compound cutters 46 are adapted to move vertically downward to operate along the sides of the flap as it is clamped in its vertical position shown in Fig. 2 and are also adapted to move transversely toward and away from each other in unison as they operate on the flap so that the flap may be shaped to the proper outline. When the cutters 46 operate on the tip portion of the flap they may be closed together and separated only by the flap support 16, said cutters as they move downward toward the root portions of the flap commonly being moved apart to suit the increasing width of the flap. For convenience only the mounting for the left compound cutter 46 will be described in detail, the right compound cutter, as above explained, being similar to but reversed from the left cutter mounting.

The left cutter shaft 134, to the right or inner end portion of which the left compound cutter 46 is secured, is rotatably mounted on a left cutter bracket 142 (Figs. 1, 4, 6 and 8) and lies horizontally and transversely in the machine. A slideway 144 formed in the left cutter bracket 142 engages a complementary vertical guide portion 145 provided on a left cross slide 146 slidably mounted in a transverse slideway 148 formed on a plate 140 mounted in the frame 2. As will be more fully explained, the left-hand cutter 46 may move downwardly to operate along the left side of the flap by virtue of the slideway 144 and may move toward and away from the right hand cutter 46 to shape the flap in a desired manner by virtue of the slideway 148.

Heightwise movement is imparted to the left cutter bracket 142 through the medium of a slide rod 150 (Figs. 1, 4 and 6) which is arranged in parallel relation to the cutter shaft 134 with its right-hand end portion sliding in a bore formed in the cutter bracket 142 and its left-hand end portion fixed in a drive bracket 152 which is secured to a guide 141 itself vertically slidable in a guideway 141a formed on the plate 140. The arrangement is such that vertical movement imparted to the drive bracket 152 in a manner hereinafter to be explained causes a like vertical movement of the cutter bracket 142 while the slide rod 150 permits transverse movement of the cutter bracket 142 relatively to the drive bracket 152. A bore 156 (Fig. 8) and an annular groove 158 are formed in the left drive bracket 152 coaxially with the cutter shaft 134, said bore and groove being adapted to receive respectively a spigot 160 formed on the right branch of a fork formed in the forward end portion of a left pulley arm 162, and a series of radial lugs 164 formed on the spigot. Gaps (not shown) are formed in the wall of the annular groove 158 to allow the radial lugs 164 to enter the annular groove. The construction and arrangement are such that the lugs 164 engage the walls of the annular groove 158 during a small angular movement of the pulley arm 162 relatively to the drive bracket 152 which, as will be more fully explained, occurs during the operation of the machine. It thus follows that the walls of the annular groove 158 by sliding along the radial lugs 164 permit slight angular movement of the pulley arm 162 relatively to the drive bracket 152 but prevent widthwise movement of the spigot 160 in the bore 156.

A drive shaft 168 having a pulley 170 fixed to its intermediate portion is rotatably housed in the branches of the fork formed in the forward end portion of the pulley arm 162, said drive shaft being coaxial with the cutter shaft 134. A universal coupling 174 connects the drive shaft 168 to the cutter shaft 134 by means of a shaft 176 having a ball-joint portion 172 (Fig. 8), the construction and arrangement being such that the pulley 170 may continue to drive the compound cutters 46 as the cutter bracket 142 carries the cutter shaft transversely toward and away from the drive shaft. A bore 186 is formed in the drive shaft 168 and the ball portion 172 of the shaft 176 engages this bore and end portions of a pin 188, fixed to said ball portion, engage longitudinal slots 190 formed in the bore 186. The shaft 176 is fixed to the universal coupling 174 so as to connect the drive shaft 168 to the cutter shaft 134. By reason of the pin 188, engaging the slots 190 the drive shaft 168 is enabled to drive the cutter shaft 134 continuously during the operation of the machine notwithstanding that the cutter shaft may move axially toward and away from the drive shaft during such operation.

It will thus be clear that the drive shaft 168 may continue to drive the cutter shaft 134 as the cutter bracket 142 and the drive bracket 152 move upwardly or downwardly together, the former on the guide portion of the slide 145 and the latter on the guide 141 which travels in the guideway 141a formed on the plate 140 as the cutter bracket moves transversely away from the drive bracket by reason of the slideway 148. Accordingly the flap F in its vertical position may be trimmed and skived to the shape required from its tip portion to a region close to its root adjacent to the heel seat of the shoe by the cutters on their downward movement and, if required, by their transverse movement. The universal coupling 174 tends to reduce any vibration which may arise should wear on the slideways tend to cause misalinement of the cutter shaft 134 relatively to the drive shaft 168.

Fixed to the frame 2 are left and right pins 196 (Fig. 6 in which only the left-hand pin is shown) which are coaxial with each other. Pivoted about these pins are the upper portions of right- and left-hand arms 194 and journaled in the lower portions thereof is a shaft 192 which extends widthwise of the machine. The left pulley arm 162 is pivoted about the left portion of the shaft 192 and the right pulley arm 162 is pivoted about the right portion thereof. Fixed to the shaft 192 and leftwardly of the left pulley arm 162 is a pulley 200, and a belt 198 connects the left drive pulley 170 to the pulley 200, there being also an adjustable idler pulley 202 mounted on the left pulley arm 162 for tensioning the belt 198. A similar construction is also provided for connecting the shaft 192 to the right drive pulley 170. Accordingly when the shaft 192 is caused to rotate, by means hereinafter described, so also are the compound cutters 46 caused to rotate by reason of their connections through the cutter shaft 134, the universal couplings 174, the shafts 176, the drive shafts 168, the drive pulleys 170 and the pulleys 200 which are secured to the shaft 192.

Each compound cutter 46 has associated with it a flap guide 214 (Figs. 4, 6 and 8) arranged adjacent to the cutters and adapted to engage the outer or grain surface of the flap F and to support adjacent margins of the flap as it is being trimmed and skived. Only the mounting of the left flap 214 will be described in detail in view of the fact that the mounting of the right and left flap guides are identical but reversed.

The left flap guide 214 has a flap engaging face 216 and is secured to an adjustable plate 218 provided with an arcuate rib 220 and a slot which engage respectively an arcuate guideway and a projection 226 formed on an adjustable guide slide 228. The projections 226 and the arcuate ribs 220 are centered respectively about vertical outer edges of the associated faces 216. A dovetail slide 230 formed in the guide slide 228 engages a complementary horizontal slideway which extends forward and rearward and is formed in the cutter bracket 142. By the provision of the slide 230 the flap engaging face 216 of the flap guide 214 can be adjusted bodily toward and away from the compound cutter 46 to vary the thickness of the edge formed on the flap by the cutter. By virtue of the arcuate rib 220 and the projection 226 the flap engaging face 216 can be inclined relatively to the compound cutter to vary the angle of skive cut on the flap by the cutter. An adjusting screw 232 threaded into a lug 234 of the guide slide 228 is provided for adjustment of the flap guide toward and away from the cutter, this screw being rotatable in the cutter bracket 142 but restrained from axial movement relatively to the bracket by a knurled and graduated head 238 fixed to the screw. The flap guide 214 may be described as forming a V-shaped notch with the compound cutter 46.

To secure the flap guide 214 in the desired angular position there is provided a clamp screw 240 which is threaded into the plate 218 and passes through a slot 242 formed in the guide slide 228. A pointer 244 formed in the flap guide 214 cooperates with graduations marked on the guide slide 228 to indicate to an operator the angular position of the flap guide.

In order to cause the trimming and skiving operation to progress along the opposite edges of the breast flap F heightwise movement is imparted to each of the compound cutters 46 by a multi-arm lever 248 (Fig. 6) pivoted on a longitudinal transverse shaft 250 fixed in the frame 2. Forward end portions of arms 248a of the lever 248 are pivotally connected to the lower end portions of links 252, the upper end portions of which are pivotally connected to the lower portion of the guides 141 on which the brackets 152 are mounted. A middle arm 248b of the lever 248 is pivotally connected to the lower end portion of a link 254 the upper end portion of which is pivotally connected to the forward end portion of a composite cam lever 256 pivoted between its ends on the longitudinal transverse shaft 70 fixed to the frame 2. Two cam rolls 260, 262 are rotatably mounted on the rearward end portion of the cam lever 256, the roll 260 engaging a cam track or face 264 extending part way around a cam 268 and the roll 262 engaging an outer cam face 266 on the cam 268 which is fixed between the cams 80 and 130 on the main shaft 6. The cam track 264 acts to move the compound cutters 46 positively and simultaneously downward to trim and skive the edges of the flaps uniformly as the latter is held in its vertical position. The outer cam face 266 acts to raise the cutters into their raised inactive positions.

The method by which the transverse movement is imparted to the left and right cutter brackets 142 and hence to the compound cutters 46 will now be described.

Blocks 270 (Figs. 4, 5 and 6) rotatably mounted one on the rearward face of each cross slide 146, and movable widthwise in slots 147 formed in the plates 140 respectively engage forks formed in the swinging lower end portions of two cutter arms 272, the upper end portion of the left hand arm 272 being fixed to a shaft 274 and the upper end portion of the right-hand arm 272 being pivoted on a fulcrum pin 276 fixed in the frame 2. The shaft 274 is journaled horizontally in the frame 2 lying from front to rear, parallel to and at the same height as the pin 276. Fixed to the shaft 274 rearwardly of the left-hand cutter arm 272 is an arm 278 which extends downwardly and to the right and is pivotally connected to the lower end portion of a link 280 the upper end portion of which is pivotally connected to an arm 282 which is secured to the right-hand cutter arm 272 for movement about the shaft 276. Thus rocking movement imparted to the shaft 274 in a manner hereinafter explained causes the cutter arms 272 and thus the compound cutters 46 to move toward and away from each other as the cutters travel down the flap, so that the flap is shaped as required during the trimming and skiving operation. Likewise on the termination of the operation the cutters may be moved toward and away from each other on their upward movement.

Rocking movement in either direction is imparted to the shaft 274 by a bell crank lever 284 (Figs. 5 and 6), rotatably mounted on the shaft rearwardly of the arm 278. An abutment 286 (Fig. 5) is formed on the arm 278 which abutment is urged into engagement with a complementary abutment 287, formed on the bell crank lever 284, by a spring plunger 288 which is housed in the bell crank lever 284 and engages an upwardly extending tail 290 formed on the arm 278.

By virtue of the abutment 286 the shaft 274 may be urged yieldingly in a clockwise direction (as seen by an operator) by a tension spring 292 acting through the bell crank lever 284 and abutment 287, opposite ends of the tension spring being attached respectively to one upwardly extending arm of the bell crank lever 284 and to the frame 2. When, however, the bell crank lever 284 is rocked in an anticlockwise direction against the resistance of the spring 292 by means now to be described, the shaft 274 is urged yieldingly in an anticlockwise direction by the spring plunger 288.

The other arm of the bell crank lever 284 which extends rightwardly is connected by a ball joint 294 to the upper end portion of a link 296 the lower end portion of which is connected by a ball joint 298 (Fig. 6) to the forward end portion of a lever 300 pivoted between its ends on a pin 302 fixed in the frame 2 and parallel to the main shaft 6. The rearward end portion of the lever 300 is pivoted to the upper end portion of a hollow link 304 the lower end portion of which is embraced by a fork 306 of a cam lever 310 and is pivoted on a pin 308 fixed in the fork. The cam lever 310 is pivoted on a pin 312 fixed in the frame 2. A cam roll 314 rotatably mounted on the right-hand end portion of the pin 308 which projects beyond the fork 306 engages an outward or open cam track 316 formed on a cam 318 secured between the cams 130 and 268 to the main shaft 6, which passes through a clearance hold 319 formed in the hollow link 304.

As will be more fully explained, the cam track 316 during each cycle of operation acts to rock the shaft 274 in an anticlockwise direction as viewed in Figs. 4 and 5 and hence acts so as to move the compound cutters 46 toward each other so that as the cutters move downwardly under the action of the cam track 264 they are progressively spaced apart appropriate distances for imparting to the flap the desired progressive increase in width. The cutters are thereafter moved apart, to inactive positions, by the tension spring 292.

Anticlockwise movement of the shaft 274 is limited (and thus inward movement of the compound cutters is limited) by a movable cam plate 320 (Figs. 4, 9, 10 and 11) (mounted in a manner to be described) which engages a cam roll 322 (Figs. 4 and 7) rotatably mounted on an arm 324 adjustably secured to the shaft 274. Thus when the cam face 316 (Fig. 6) acts to move the compound cutters toward each other, the spring plunger 288 (Fig. 5) yields to allow the cam roll 322 (Fig. 4) to accommodate itself to the cam plate 320. As will be more fully explained the cam plate 320 acts to space the compound cutters a desired distance apart before they start to move downwardly and as they move downwardly it also moves and accordingly, in cooperation with the cam track 264, varies the distance the cutters are spaced so that the flap is skived and trimmed to the desired shape.

The method by which the arm 324 (Figs. 4, 6 and 7) is adjustably secured to the shaft 274 will now be described. A forward portion of the shaft 274 is journaled in a sleeve 326 and the sleeve is journaled in a bearing 328 formed in the frame 2. The arm 324 is fixed to the rearward end portion of the sleeve 326 and a lever 330 is secured to the forward end portion of the sleeve. Formed in the lever 330 is a groove 331 for receiving a key 332 mounted on the sleeve 326 so that the lever 330 and the arm 324 rotate as a unit with the sleeve 326.

Constrained for rotation with the shaft 274 by the provision of a groove 333 and key 335 is a plate 334 at the top end of which is an arcuate slot 336 concentric with the axis of the shaft 274. Engaging in the slot 336 is a clamping screw 338 fixed to the end of the lever 330. An adjusting arm 340 is pivoted about a pin 342 secured in the left-hand portion of the plate 334. In the right-hand portion of the adjusting arm 340 is a slot 344 eccentric to the pivot point of the adjusting arm also engaged by the clamping screw 338. In this way, by manually rocking the arm 340 about the screw 338, the angular position of the shaft 274 relatively to the arm 324 may be varied to determine the widthwise separation of the cutters 46 when the roll 322 engages the cam 320 during the downward movement of the cutters. To aid the operator a pointer protrudes from the right-hand portion of the adjusting arm 340 which pointer cooperates with graduations on the plate 334. Accordingly by a simple movement by the operator the pointer may be adjusted so that the cutters are set for different widths of heels.

The cam plate 320 is adjustably mounted in a cam bracket 358 (Figs. 4, 9, 10 and 11) which is connected by means hereinafter described to a carriage 346 which is slidable on a cylindrical slide bar 348 fixed transversely in the frame 2, the left-hand end of this bar being somewhat lower than the right-hand end. Sliding movement is imparted to the carriage 346 by a bell crank lever 350 (Fig. 4) pivoted at the elbow in an intermediate portion of the shaft 274. Forks formed in the arms of the bell crank lever 350 engage respectively a block 352 (Figs. 4 and 6) rotatably mounted on the upper portion of the left-hand drive guide 141 and a block 354 (Figs. 4 and 9) rotatably mounted on a stud 356 fixed in the left-hand end portion of the carriage 346. Accordingly, heightwise movement imparted to the compound cutters 46 by the cam tracks 264 or 266 by rocking the bell crank lever 350 causes movement of the carriage 346 and thus the cam plate 320 which engages the cam roll 322.

From the foregoing is thus follows that if the cam plate 320 is suitably shaped and positioned it will, as it is carried over the cam roll 322 by the carriage 346, progressively adjust the distance by which the compound cutters are spaced apart as they move downwardly, so as to trim and skive the flap to the desired shape, the cam plate thus modifying the cutter-separating action of the track 264 which would by itself impart separating movements to the cutters which would be suitable for some, but not all, of the work to be offered to the machine. The mounting of the cam plate 320 beneath the carriage 346 is such that the cam plate 320, though easily replaced by cam plates for other styles of work, may be used satisfactorily, by adjustment, for a wide variety of flaps differing in size and to a lesser extent in style.

The cam plate 320 (Fig. 9) is secured to the U-shaped cam bracket 358 (Fig. 11) having forward and rearward walls arranged parallel to the cam plate, said plate being provided with a tongue 360 which engages a complementary groove 361 formed in the rearward wall of the cam bracket to which the cam plate 320 is secured by a clamp bolt 362 (Fig. 9) threaded through the forward wall of the cam bracket. This groove 361 lies substantially parallel to the slide bar 348 and on removal of the clamp bolt 362, the clamp plate 320 can be withdrawn to the right, to be replaced by a cam plate for a different style of flap. The cam bracket 358 is mounted for heightwise and tipping movement relative to the carriage 346 in such a manner now to be explained, that the force exerted by the spring plunger 288 (Fig. 5) and transmitted by the cam roll 322 to the cam plate 320 has no appreciable tendency to rock the carriage 346 around the cylindrical slide bar 348.

The cam bracket 358 is pivoted on the inner end portions of coaxial pins 364, (Figs. 9 and 11) the intermediate portions of which are fixed in the lower end portions of two parallel links 366, and the outer end portions of which engage parallel slots 368 formed in plates 370 secured respectively to the front and to the rear of the right-hand end portion of the carriage 346. The slots 368 lie in a plane substantially perpendicular to the slide bar 348.

The upper end portions of the parallel links 366 are pivoted by coaxial pins 372 to arms of two bell crank levers 374 extending rightwardly. The forward bell crank lever 374 has fixed to its elbow a sleeve 376 (Fig. 11) which extends inwardly so as to engage pivotally a bore formed in the lower portion of the carriage 346. The elbow of the rearward bell crank lever 374 is fixed to the rearward portion of the sleeve 376, and the upper arms of the bell crank levers are also connected by a sleeve 371 which extends above the carriage 346 so that the bell crank levers may be rocked in unison.

Engaging in the front end portion of the sleeve 376 is a spigot 420 formed on the lower rearward face of a slide member 418 (Figs. 9 and 11). An arcuate slideway 424 is formed in the upper left-hand portion of the slide member 418, which slideway is engaged by a binding screw 422 threaded in the front bell crank levers 374, when the binding screw is tightened the bell crank levers 374 and the slide member 418 may be rocked as a unit. Rotatably mounted on a pin or stud portion 373 fixed to the forward righthand portion of the slide member 418 is a cam roll 378 which engages a straight track 380 formed on a track plate 382 (Figs. 4 and 11). The track plate 382 is mounted, in a manner hereinafter explained, for heightwise movement such that the straight track remains substantially parallel to the slide bar 348.

The construction and arrangement are such that rocking movement imparted to the bell crank levers 374 by the cam roll 378 (under the influence of the straight track 380) determines the heightwise position of a portion of the cam plate 320 adjacent to the pins 364 relative to the carriage 346. The heightwise position is not changed appreciably as the movement of the carriage 346 on the slide bar 348 carries the cam roll 378 lengthwise of the straight track 380. The slots 368 in the plate 370 permit heightwise movement of the cam plate 320 while preventing it moving longitudinally relatively to the carriage 346.

Formed in the forward and rearward walls respectively of the left-hand portion of the cam bracket 358 are a pair of arcuate forwardly and rearwardly extending slots 384 (Figs. 9 and 10) of equal radius struck about a common center lying above the cam bracket. The lower arms of an H-shaped link 386 embrace the cam bracket 358 and a binding stud 392 is adjustably secured in the slot 384 to the cam bracket 358 by a binding nut 394, while a pin 388 fixed in the rearward lower arm of the link 386 engages the rearward slot 384 so that the H-shaped link may be adjustably clamped in varying positions within the limits of the slots 384. The left-hand portion of the cam bracket 358 is thus connected to the lower end portion of the H-shaped link 386 by an adjustable fulcrum comprising the pin 388 and the binding stud 392, which are coaxial.

The front and rearward upper end portions of the H-shaped link 386 are pivoted by coaxial pins 396 to arms of bell crank levers 398 (Figs. 9 and 10) pivoted at their elbows to the carriage 346 by means of a sleeve 400 which is formed between the levers and engages a complementary bore formed in the carriage. The upper arms of the bell crank levers 398 are connected by a similar sleeve through which extends a pin 404. Thus rocking movement imparted to the levers 398 in a manner now to be described, determines the heightwise position of the fulcrum provided by the binding stud 392 and pin 388 and thus, by tilting the cam plate 320, adjusts the heightwise position of that portion of the under surface of the cam plate 320 which is adjacent to the fulcrum.

From the foregoing it is apparent that when the compound cutters 46 are in their upper position they are moved inwardly toward each other by the action of the cam face 316, until the cam roll 322 engages the underside of the left-hand end portion of the cam plate 320. The heightwise position of the left-hand end portion of the cam plate 320 thus determines the distance between the compound cutters as they start their downward operative movement. As the cutters move downwardly the carriage 346 concurrently carries the cam plate 320 to the left until the cutters reach their lowest position at which time the cam roll 322 engages the underside of the cam plate in the vicinity of the axis of the coaxial pins 364. The heightwise position of the pins 364 thus determines the distance between the cutters as they approach the root of the flap, the lowest position of the cutters in relation to the shoe being determined by the seat stop 12 and being constant for any flap.

Since, however, heightwise movement of the cutter is sufficient for an extremely long flap the cutters will normally move downward some distance before they reach the tip of a normal flap and commerce to shape it. By means of the nut 394, however, the fulcrum provided by the binding stud 392 and pin 388 can be adjusted lengthwise of the arcuate slots 384 until the distance between this fulcrum and the axis of the coaxial pins 364 corresponds to the actual length of cut made by the compound cutters as they shape the flap; that is to say, the adjustable fulcrum provided by the pin 388 and the binding stud 392 can be so positioned that it lies adjacent to the cam roll 322 at the moment when the compound cutters are shaping the tip portion of the flap, which tip portion will adjoin the top piece in the finished shoe.

Means now to be described cause the bell crank lever 398 to be rocked a predetermined amount when the bell crank levers 374 are rocked a given amount by heightwise movement of the track plate 382. As will be more fully explained, the heightwise position of the track plate 382 is changed, by manual adjustment, by positive increments, each increment corresponding to the differences in width at the base of two successive heels in a range of heels of varying sizes.

The left-hand end portion of a link 402 is pivoted on the forward end portion of the pin 404 (Figs. 9 and 10). The right-hand end portion of the link 402 is pivoted on a pin 406 fixed in a slide 408 which slide is adjustably secured by a stud 410 and a nut 414 in an arcuate slideway 416 formed in the aforesaid slide member 418. When the slide 408 is in the lowest position in the arcuate slideway 416 the pin 406 is coaxial with the spigot 420 and sleeve 376.

A bias adjustment is provided by the binding screw 422 and the arcuate slot 424. This bias adjustment enables the slide member 418 to be rotated on its spigot 420 and secured in a desired position. In one position of the slide member 418 relative to the bell crank levers 374 the slide 408 may be moved lengthwise of the arcuate slideway 416 to rock the link 402 about the pin 404 without disturbing either the levers 374 or the levers 398.

In considering the use of the various adjustments it will be convenient to take first the case of a range of heels all of the same style but differing in size in which range two heels of different sizes differ in width by the same amount from top to bottom of the heel breast. It will be assumed that a suitable cam plate 320 (Fig. 4), has been fitted and that the binding stud 392, in the arcuate slot 384 (Figs. 9 and 10), the binding screw 422, in the arcuate slot 424, and the adjusting arm 340 (Figs. 4 and 7) are so positioned that the compound cutters 46 shape a flap to fit accurately one of these two heels. Then in order to shape a flap to fit the other of these two heels it is necessary so to position the slide 408, by means of the nut 414, that the distance between the axes of the pin 406 and sleeve 376 is equal to the distance between the axes of the pin 404 and sleeve 400. The geometry of the system is such that with the slide 408 so positioned, a given heightwise movement of the track plate 382 causes the heightwise position of the cam roll 322 to be changed substantially by an equal amount when the cutters are in their lowest position and when the cutters engage the tip of the flap; that is, a change in the heightwise position of the track plate 382 between the shaping of successive flaps causes these flaps to differ in width by substantially constant amounts all along their shaped lengths.

Consider now the case of a pair of heels of the same style but different sizes and which differ in width by an amount which diminishes by half from top to bottom of the heel breast. With a suitable cam plate 320 and other appropriate settings as described above the slide 408 is set so that the distance between the axes of the pin 406 and sleeve 376 is about half the distance between the axes of the pin 404 and sleeve 400. With this setting a change in the heightwise position of the track plate 382 causes both a heightwise movement and a tilting movement of the cam plate 320 which movements when made between the shaping of successive flaps causes those flaps to differ in width by an amount which diminishes substantially by a moiety from top to bottom of the heel breast.

Contemplating the instance of two heels of the same style but different sizes which differ in width at their bases but not at their top pieces; assuming that the cam plate and other settings are appropriate, the slide 408 is set with the pin 406 coaxial with the sleeve 376. With this setting of the slide 408 a change in the heightwise position of the track plate 382 leaves the lever 398 unmoved, the cam plate 320 tilting about the adjustable fulcrum provided by the binding stud 392 and pin 388; but leaving substantially unmoved that portion of the cam plate 320 which engages the cam roll 322 as the compound cutters 46 engage the tip of the flap. Thus such a change in the heightwise position of the track plate 382 when made between the shaping of successive flaps will cause the flaps to differ in width at the heel base without differing substantially at the top piece.

From the foregoing the importance of the adjustable fulcrum in determining the height of heel at which a given diminution in size increment (from the size increment at the base of the heel) is to occur will be understood. For it will be comprehended that if the fulcrum, about which the cam plate 320 is tilted, is erroneously varied the heightwise position of the cutters which should coincide with the tip of the flap may in fact the above or below the flap tip. A similar error may arise where the change of width required in successive flaps varies lengthwise of the flap.

Where, however, the slide 408 is so positioned that heightwise movement of the track plate 382 causes the cam plate without tilting to move heightwise, the position of the binding stud 392 in its arcuate slot 384 is immaterial as the radius of the arcuate slot 384 is equal to the length between the centers of the H-shaped link 386.

The bias adjustment provided by the binding screw 422 and arcuate slot 424 enables an operator to tilt the cam plate 320 about the fulcrum in one direction or another without affecting appreciably the other available adjustments. Thus the one cam plate may be used for two heels differing in their degree of taper although the edges of their breast faces follow similar curves; whereas but for the provision of the bias adjustment of different cam plate would be required for each change in heel style.

The means by which the track plate 382 is moved will now be described (Figs. 4 and 11). The track plate 382 is provided at its right-hand end with an upwardly extending lug 430 having forward and rearward faces engaging inner rubbing faces of a fork 432, the lug 430 being pivoted on a pin 434 fixed in the arms of the fork. The fork 432 is formed in the forward portion of, and extends to the right of a bell crank lever 436 secured at the elbow to an intermediate portion of a horizontal shaft 438 which is journaled in the frame 2 parallel to the shaft 274.

A lug 440 which extends upwardly from the left-hand end portion of the track plate 382 is pivoted on a pin 442 fixed in an arm formed in and projecting to the right of a bridge lever 444 fixed to coaxial pins 446 journaled in the frame 2 and lying parallel to the shaft 438. The bridge lever 444 is shaped to bridge the carriage 346 and associated parts as they move to the left in a manner previously described above.

The right- and left-hand end portions of a link 448 are respectively embraced by forks formed in upwardly extending portions of the bell crank lever 436 and the bridge lever 444 and are respectively pivoted on pins 450 and 452 fixed in those forks. The construction and arrangement are such that slight rocking movement imparted to the forward coaxial pins 446 in a manner now to be described causes the levers 436 and 444 to rock in unison to move the track plate 382 bodily heightwise.

The inner rubbing faces of the fork 432 support the track plate 382 against forward and rearward displacement under the load applied by the cam roll 378.

The forward end portion of one of the coaxial pins 446 emerges from the frame 2. A handle constituting a size arm 454 outside the machine and extending at right angles to the pin 446 has integral with its right-hand end portion a sleeve acting as a bushing and enclosing the forward end portion of the pin 446, the arrangement being such that the pin may rotate freely therein. Mounted on the swinging left-hand end portion of the size arm 454 is a spring plunger 456. This spring plunger lies horizontally and has a knob 458 secured to its forward end portion, a rounded rearward end thereof being adapted to engage any one of a series of recesses 460 formed in the frame 2 and thus to receive the size arm in a desired position.

At the rear end portion of the size arm 454 is a clamp screw 462 which passes through a slot formed in the frame of the machine to unite with the left hand portion of the bridge lever 444 and thus to lock the size arm and bridge lever together for movement, as a unit, about the pin 446.

In the shoe manufacturing trade it is usual to grade heels for size difference of $1/16''$, thus the width of a heel at the base will differ by $1/16''$ from a heel of the same range and style graded one size larger or smaller. Therefore the recesses 460 are so spaced that movement of the size arm 454 to carry the spring plunger from one of the recesses to the next moves the track plate 382 and accordingly the pin 364 and the cam 320 sufficiently to change the distance between the compound cutters 46 when in their lowest position by $1/16''$. To aid the operator size graduations are marked on the frame 2 and a pointer formed on the left-hand end of the size arm is provided to enable the operator to select conveniently the appropriate recess which will allow him to operate satisfactorily on a heel of the next size.

It may sometimes occur through change of style that the base of a heel of given standard size has increased or diminished in area without an increase in the nominal size of the heel. In the illustrative machine such change requires the end stop 20 (Fig. 4) to be moved rearwardly without moving the size arm 454 or the side gages 18. This may be accomplished by unscrewing the clamp screws 462 from the size arm and then rocking the bridge lever and, as will be more fully explained hereinafter, thus moving the end stop in the required direction.

A shoe manufacturer may produce two ranges of shoes wherein the shapes of the heels of both ranges are similar and the increments of width at the heel base are $1/16''$ between sizes for both ranges, but the base widths of the heels of a particular size differ between the two ranges. In such a case the adjustment provided by the adjusting arm 340 (Figs. 4 and 7) enables a single cam plate 320 to be used satisfactorily with two or more ranges of heel which are similar but differ in overall width at the base size for size.

Means now to be described enable the operator by moving the size arm 454 to adjust not only the cutter spacing means but also the positions of the side gages 18 and the end stop 20. Thus once the illustrative machine has been set to operate correctly on a shoe of one size and style, of a normal character, the operator may by adjustment of the size arm 454 alone set the machine to operate on a shoe of any other size in that particular style. It will be apparent that a change in the size, but not in the style, of shoe being operated on involves changes in the position of the side gages 18 and end stop 20 which, by determining the fore and aft position of the shoe in the machine, determines the length of breast flap which will overlie the flap support 16 and will be trimmed by the cutter and also changes in the spacing apart of the compound cutters 46, other adjustments to the illustrative machine being usually unnecessary provided that the style of shoe is of normal kind.

The side gages 18 (Fig. 4) which lie immediately beneath the forward end portions of the seat stop 12 are in the form of inwardly facing abutments formed on the inwardly curved end portions of upwardly extending arms of a pair of bell crank gage levers 464. The left-hand gage lever 464 is pivoted at the elbow on a pivot 465 fixed in a bracket 466 secured to the frame 2 by bolts. The right-hand gage lever 464 is adjustably secured by a clamp bolt 469 to the forward end portion of a shaft 470 journaled in the bracket 466 parallel to and at the same height as the pivot 465. Gear teeth 472 formed on the leftwardly projecting arm of the right-hand gage lever 464 mesh with complementary teeth formed on the arm which projects to the right of the left-hand gage lever 464, the construction and arrangement being such that rocking of the shaft 470 causes the side gages 18 to move by equal amounts toward and away from each other.

The angular position of the shaft 470 (Fig. 5) is determined by a wedge roll 474 rotatably mounted on an upwardly extending arm of a bell crank lever 476 secured to the rearward end of the shaft, and pressed into engagement with a wedge 478 by the action of a tension spring 480 anchored to a lateral arm of the lever 476 and to the frame 2.

The wedge 478 is formed on the upper end portion of a link 482 the lower end portion of which is pivoted on a pin 484 and is pressed by the wedge roll 474 against a support roll 486 rotatably mounted in the frame 2. The construction and arrangement are such that an increment of heightwise movement imparted to the pin 484 in a manner hereinafter described causes the wedge 478 to rise between the support roll 486 and the wedge roll 474 to move the wedge roll to the left against the resistance of the spring 480 sufficiently to move the side gages 18 apart by the desired amount to admit a shoe of larger size.

The pin 484 is fixed to the right-hand end portion of a lever 488 which is pivoted between its ends on a pivot 490 fixed in the frame 2 and has a pin 492 fixed in its left-hand end portion. Pivoted on the pin 492 is the lower end portion of a link 494 the upper end portion of which is pivoted on a pin 496 fixed in the left-hand end of an arm 497 the right-hand end of which is fixed to the rearward end portion of the rearward coaxial pin 446 (Figs. 4 and 5) which as already described is fixed to the bridge lever 444 to which the size arm is locked. The arrangement is such that a movement of the size arm from one setting to the next causes the side gages 18 to move the appropriate amount for the change of size for shoes of a normal kind.

The movement by which the spacing of the side gages requires to be varied from size to size in any normal style of shoe is unlikely to vary appreciably. The overall width at the seat of a shoe of given size may however vary appreciably from style to style. The clamp bolt 469 (Fig. 4) provides means whereby the side gages 18 can be set to suit one particular shoe of a given style. The size arm 454 thereafter repositions the side gages automatically for other sizes of shoes of that style.

The rack 28 (Figs. 2 and 5) on a lateral extension of which the end stop 20 is formed engages an idler pinion 498 rotatably mounted in the frame 2 which also engages a rack formed on a rod 500 slidable vertically in the frame 2. A rounded rubbing face 501 formed on the upper end of the rod 500 is urged upwardly, by a tension spring 502 anchored to the rack 28 and to the frame 2, into engagement with a wedge 504. The wedge 504 is formed on the left-hand end portion of a link 506 the right-hand end portion of which is pivoted on a pin 508 fixed in the lower end portion of an arm 510 the upper end portion of which is secured to the rearward end portion of the shaft 438 (Figs. 4 and 5). This rocking movement imparted to the arm 510 by movement of the size arm 454 causes transverse movement of the wedge 504. Upward movement of the wedge 504 under the action of the spring 502 is prevented by a rotatably mounted support roll 512 which is adjustable heightwise in a manner hereinafter explained. The arrangement is such that movement of the size arm 454 from one setting to another causes the end stop 20 to move the appropriate amount for this change of size for shoes of a common style.

The amount by which the end stop 20 requires to be moved for change of size is unlikely to vary appreciably, the actual position, lengthwise of the shoe, of the breast of the heel may however vary to a large extent for a shoe of given size from one style to another. Means now to be described enable an operator to adjust the heightwise position of the support roll 512 and thus to position the end stop 20 correctly for one particular size of shoe of a given style. The size arm 454 thereafter repositions the end stop automatically for other sizes of shoes of that style.

The support roll 512 is rotatably mounted on the swinging right-hand end portion of an arm 514 the left-hand end portion of which is secured to the rearward portion of a shaft 516 journaled in the frame 2 parallel to the shaft 274. A plate 518 fixed to the forward end portion of the shaft 516 is provided with a radial slot 520 which engages an eccentric 522 extending forward from a pin 524 journaled in the frame 2. A handle 526 secured to the eccentric 522 enables an operator to swing the eccentric about the axis of the pin 524 and thus to raise or lower the support roll 512. A clamp bolt 528 passing through an arcuate slot 530 formed in the plate 518 and threaded in the frame 2 enables an operator to secure the support roll 512 in a desired position.

The means by which the compound cutter 46 and main shaft 6 are caused to rotate will now be described. An electric motor 540 (Fig. 1) is mounted inside the column 4, on the shaft of which is a pulley 538 connected by a belt 534 to another pulley 536 fixed to the right-hand portion of a countershaft 212 journaled in a countershaft bracket secured in the column 4. Mounted on the left-hand portion of the countershaft 212 is a pulley 210 connected by a belt 208 to a pulley 206 mounted on the left-hand end of the shaft 192 (Fig. 6). As has been described, rotation of the shaft 192 causes the compound cutters to revolve.

Mounted leftwardly of the pulley 536 (Fig. 1) on the countershaft 212 is a pulley 542 which is connected by a belt 544 to a pulley formed on the main shaft 6. The pulley 542 forms part of a gear reduction system of common type calculated to revolve the main shaft 6 at comparatively few revolutions per minute, as contrasted with the compound cutters which owing to the arrangement and size of the pulleys employed in connecting the cutter shaft to the motor rotate at comparatively high speed.

The clutch 8 is of the one-revolution type of well-known construction, and is connected to the treadle 10 by a link 546. The construction and arrangement are such that to commence operating the machine the motor 540 is switched on causing the compound cutters to revolve but the main shaft 6 does not rotate until the treadle 10 is depressed. When the main shaft 6 has rotated once it will stop, and it is necessary to allow the treadle to be raised before the main shaft rotates again, which may be accomplished by further depression of the treadle.

From the above it will be understood that the operations of clamping a flap between the clamps 44 and flap support 16 causing the flap to be raised, causing the cutters to operate on the flap and then return to their inoperative positions and finally causing the flap to be lowered and unclamped all take place during one revolution of the main shaft 6.

Figure 12:
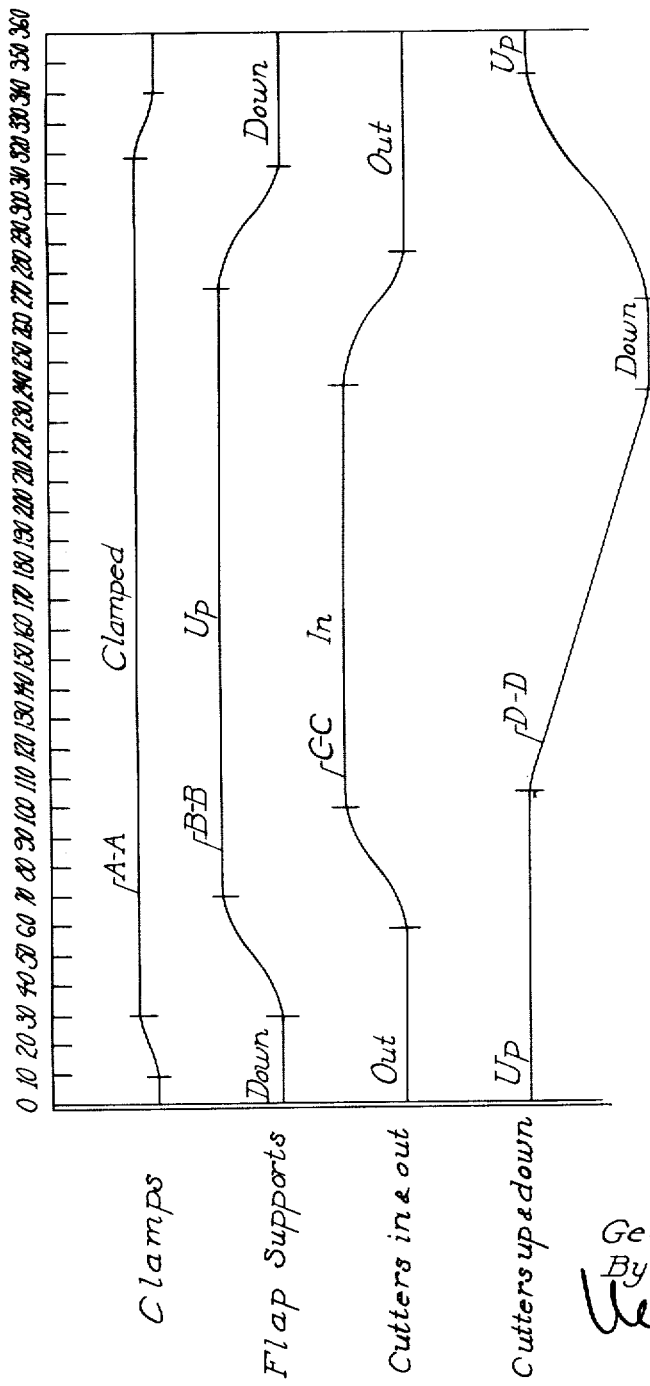
Fig. 12 is a chart illustrating the timing of the various operative parts of the machine.

The timing of the movements of the compound cutters 46, the flap support 16 and the clamps 44 will now be considered with reference to Fig. 12.

Fig. 12 represents a graph in which the degrees of rotation of the main shaft 6, and the positions of the various parts at each stage of the cycle of operations of the illustrative machine are shown. In the graph the single revolution of the main shaft which, as explained above, constitutes a complete cycle of operation is represented as commencing and finishing in the normal stopping position.

Line A—A in the graph represents the position of the clamps 44 in their movements toward and away from the flap engaging face 42 of the work support 16. Line B—B represents the position of the work support as it moves between a lower flap receiving position and its upstanding position in which it holds the flap substantially vertical while the flap is shaped by the compound cutters 46. Line C—C represents the movements of the bell crank lever 284 which imparts transverse movement to the compound cutters 46 the extent of the movement of the cutters being limited by yielding of the spring plunger 288 under the action of the cam plate 320. The line D—D represents the heightwise position of the compound cutters 46.

When the main shaft is in its starting position, 0°, and until it has turned through about 10° the clamps are raised, and the flap support is lowered, the compound cutters 46 being fully spaced apart in their fully raised positions.

When the main shaft 6 has turned through about 10° the clamps move to clamp the flap against the flap support, the flap being fully clamped by the time the main shaft has turned through about 25°. As soon as the flap F is clamped the flap support 16 swings upwardly, the flap engaging face 42 reaching its vertical position by the time the main shaft has turned through about 70°. Before the flap support 16 is fully raised and when the main shaft 6 has turned through about 60° the lever 284 starts to move the compound cutters 46 inwardly toward each other. It will be noted that the widest spacing of the cutters is considerably greater than the widest part of any normal flap and that the cutters will not approach closely the tip portion of a flap until after the flap engaging face 42 has assumed its vertical position.

The lever 284 ceases to move when the main shaft 6 has turned through about 105°, the cutters having ceased to move inwardly somewhat earlier at the time when the spring plunger 288 started to yield on engagement of the cam roll 322 with the cam plate 320. The exact time at which the cutters cease to move inward depends on the shape and setting of the cam plate 320. As soon as the lever 284 has ceased to rock, the cutters 46 start to move downward to shape, trim and skive the flap, this being a slow movement which continues until the main shaft has turned through about 240°. As the cutters move downward the flap engaging face 42 of the work support remains vertical with the flap clamped to it by the clamps 44 and the lever 284 remains stationary. It will be understood that though the lever 284 is stationary as the cutters 46 move downwardly concurrent movement of the carriage 346 causes the cam plate 320 to move the cutters toward and away from each other in unison as they descend.

As soon as the compound cutters 46 have reached their lowest position the lever 284 starts to move them apart, the cutters being fully separated when the main shaft 6 has turned through about 285°. The cutters 46 now remain fully spaced apart until the main shaft 6 comes to rest. Before the cutters 46 are fully separated the flap support 16 starts to descend (the main shaft having turned through about 275°) and the cutters start to rise. It will be understood that at the time the cutters 46 start to rise they are spaced sufficiently far apart to be clear of the flap F and flap support 16. As soon as the flap support 16 has reached its lowest position the main shaft having now turned through about 315°, the clamps 44 move to release the flap. By the time the main shaft 6 has turned through about 345° the cutters 46 have reached their upper position. The cutters 46 and the clamps 44 are now in their starting position for the commencement of an operation, and the remaining 15° of turn completes the revolution of the main shaft 6.

In order that the working of the illustrative machine may be made even more clear the procedures followed by an operator on a quantity of shoes of varying sizes but one style of normal character will now be described.

First a cam plate 320 of a shape to suit the shape of the heel is fitted. If no cam plate of exactly the shape required is available, then the most suitable cam plate is selected and is adjusted by the bias adjustment binding screw 422, so as to suit the flap to be operated on. Next the adjustable fulcrum is adjusted by the binding nut 394 in order to make the machine suitable for the size of heel.

This is followed by adjusting the flap guides 214 using adjusting screw 232 to obtain the desired edge thickness in the shaped flap and the clamp screw adjusted to procure the required angle of skive.

Finally the operator takes a shoe of intermediate size and sets the width between the cutters using the adjusting arm 340, sets the width between the side gages using the clamp bolt 469, and sets the position of the end stop 20 using the clamp bolt 528 and handle 526 secured to the eccentric 522. Once the illustrative machine has been set for one shoe of that particular style the operator has only to move the size arm 454 to set the machine for any other shoe whatever its size, of that style, provided the style is of normal kind. It will be understood that any necessity for additional adjustment which may arise with some exceptional styles of heel may be minimized by setting the illustrative machine initially to suit a shoe of intermediate size as opposed to a setting to suit the largest or smallest shoe of a range.

The cam 320 may be described as having a face or track 550 provided with an outer end portion 550a and having a base end or heel breast line portion 550b. It will be noted (Fig. 11) that the axis of the pins 364, may, if desirable, extend widthwise along an adjacent portion 550b of the track 550, said axis being shown as extending substantially along said portion of the track. The outer end portion 550a of the track 550 may be described as controlling the width of the outer end portion of the flap which is to cover the top lift end of the breast of the heel which is to be attached to the shoe and the base end or heel breast line portion 550b of the track 550 may be described as controlling the width of the base or heel breast line portion of the flap which is to cover the lip portion of the breast of said heel.

Having thus described my invention, what I claim as new and desire to secure by Letters Patent of the United States is:

1. In a machine of the class described, means for positioning a shoe with a feather line of its heel seat arranged substantially in a horizontal plane, a support which has a planar face adapted to receive a heel breast covering flap of an outsole attached to said shoe and which is movable between a flap receiving position in which said flap is disposed at a slight angle to said horizontal plane and a flap presenting position in which the face is disposed at right angles to said plane, a clamp, means for causing the clamp to force the heel breast covering flap against said face of the support in its flap receiving position, means for moving the support together with the clamp thus forced against the flap to said flap presenting position, a pair of combined trimming and skiving cutters and associated work guides, and means for moving said pairs of cutters and guides along the margins of the flap in its flap presenting position and toward and away from each other to trim said flap to a predetermined outline and simultaneously therewith to skive material from a flesh face of the flap adjacent to said margins.

2. In a machine of the class described, a support movable between fixed retracted and projected positions, means for positioning a shoe which has an attached outsole provided with a heel breast covering flap with said flap arranged on said support in its retracted position, a clamp which is adapted to secure the flap to the support and is movable together with the support between fixed retracted and projected positions, means for moving the support, the clamp and the flap secured between them with relation to the other parts of the shoe to their fixed projected positions, and means comprising a pair of combined trimming and skiving cutters and margin supporting guides which are movable generally lengthwise of the flap held between the support and the clamp in their projected position and are adapted to cooperate in the trimming of the flap to a predetermined outline and to skive material from the lateral margins from the flesh side of said flap.

3. In a machine of the class described, means for positioning a shoe having a heel breast covering flap, a holder for securing the flap in a predetermined position to be operated upon, a pair of compound trimming and skiving cutters, means for moving the cutters generally lengthwise along the lateral margins of the flap, and means movable in timed relation with the cutters and comprising a cam, which is mounted for translatory movement, for moving the cutters toward and away from each other as they are moved generally lengthwise of the flap, said cam being initially movable in a rectilinear path into different adjusted positions to vary equally along its length the width imparted to the flap, said cam also being initially movable into different angularly adjusted positions in response to its initial movement in said rectilinear path whereby to vary the width of the flap proportionately along different portions of its length.

4. In a flap trimming and skiving machine, means comprising side and back gages for positioning a shoe having a heel breast covering flap, a holder for retaining the flap in a predetermined position, pairs of cutters, means comprising a cam plate for moving the cutters relatively to the holder in predetermined paths to trim the flap by skiving cuts to a predetermined outline, mechanism for initially adjusting the cam plate in accordance with the desired shape to which the flap is to be trimmed, and means responsive to movement of said mechanism for moving the side and back gages into different adjusted positions.

5. In a flap trimming and skiving machine, means comprising side and back gages adapted to position a shoe having a heel breast covering flap, a holder adapted to secure the flap in a predetermined position, means for trimming the flap to a predetermined outline to fit the breast of a heel to be attached to the shoe, mechanism which is adapted to be set in different initially adjusted positions for controlling the operation of said last-named means whereby to vary the shape imparted to the flap, and means responsive to the setting of said mechanism for setting the side and back gages in different adjusted positions to locate the shoe and accordingly the flap in a predetermined position with relation to the holder.

6. In a flap trimming and skiving machine, means comprising side and back gages for positioning a shoe having a heel breast covering flap, a holder for supporting and retaining the flap in a predetermined position, means for trimming the flap to a predetermined outline, mechanism for modifying said last-named means to trim flaps to different outlines in accordance with the size and style of the breast of a heel which is to be attached to the shoe, and means responsive to movement of said mechanism for moving the side and back gages into different adjusted positions.

7. In a flap trimming and skiving machine, a slidable seat stop and a V-shaped gage adapted to be engaged respectively by the heel seat and the rear end portion of a shoe having a heel breast covering flap whereby to position the shoe heightwise and to orient its rear end widthwise, a holder for said flap, a back gage which is initially adjustable into different fixed positions lengthwise of the shoe, a pair of side gages which are movable equal distances in opposite directions toward and away from each other and are adapted to engage the portion of the shoe in the vicinity of its heel breast line, a pair of cutters, said seat stop, said V-shaped gage and said back and side gages being constructed and arranged to position the shoe in the machine with its flap in a predetermined position with relation to the flap in the holder, means for moving the cutters in predetermined paths to trim the flap to a desired outline, mechanism for modifying said last-named means for varying paths of movement of the cutters, and means responsive to movement of said mechanism for moving the side and back gages into predetermined positions to locate the shoe and accordingly the flap in different positions in the machine in accordance with the size and style of the shoe.

8. In a machine of the class described, a support for a heel breast covering flap, means for clamping the flap against the support, a cam follower, cutters, mechanism for operatively connecting the cam follower to the cutters, powered mechanism for yieldingly forcing the follower against the cam, means for effecting relative movement of the flap support and the cutters generally lengthwise of the flap, a carriage mounted for translatory movement, a cam mounted on the carriage, means responsive to the operation of the last-named means for moving the carriage in said path whereby to cause said mechanism to move the cutters toward and away from one another in accordance with the shape of the cam and the position of the cam on said carriage, and means for moving the cam into different operative positions on the carriage in accordance with the shape of the breast of the heel to be covered.

9. In a machine for trimming heel breast covering flaps, means for positioning a shoe having a heel breast covering flap, a holder for supporting the median portion of said flap in a predetermined position, a pair of rotary cutters, anvils associated respectively with the cutters and forming V-shaped notches therewith, power means for effecting relative movement of the holder on the one hand and the cutters and their associated anvils on the other hand generally lengthwise of the flap, and power means operative in timed relation with said first-named power means for imparting to the cutters and their associated anvils movement toward and away from each other as they move generally lengthwise of said flap.

10. In a machine for trimming heel breast covering flaps, means for positioning a shoe having a heel breast covering flap, a holder for supporting the median portion of said flap in a predetermined position, a pair of rotary cutters, anvils associated respectively with the cutters and forming V-shaped notches therewith, power means for effecting relative movement of the holder on the one hand and the cutters and their associated anvils on the other hand generally lengthwise of the flap, power means operative in timed relation with said first-named power means for imparting to the cutters and their associated anvils movement toward and away from each other as they move generally lengthwise of said flap, means for initially adjusting the anvil as an entirety toward and away from the associated cutters to vary the width of said notches, and means for initially swinging said anvils into different adjusted positions about the inner ends of their notches to vary the angles of said notches.

11. In a machine for trimming and skiving heel breast covering flaps, means for positioning a shoe having a heel breast covering flap, a holder for supporting the flap, a pair of rotary cutters each comprising a trimming portion and a skiving portion, means for rotating the cutters, anvils associated respectively with the cutters and forming work receiving notches therewith, power means for moving the cutters and their associated anvils relatively to the holder and generally lengthwise of the flap, and power means operative in timed relation with said last-named power means for imparting to the cutters and their associated anvils movement toward and away from each other.

12. In a machine for trimming heel breast covering flaps, means for positioning a shoe having a heel breast covering flap, a holder for supporting the flap, power means for moving the holder between flap receiving and flap presenting positions, a pair of rotary cutters, anvils associated respectively with the cutters, power means operative in timed relation with the holder for effecting relative movement of the holder on the one hand and the cutters and their associated anvils on the other hand generally lengthwise of the flap, and power means operative in timed relation with said holder and said second-named power means for imparting to the cutters and their associated anvils movement toward and away from each other.

13. In a machine of the class described, means for positioning a shoe having a heel breast covering flap, a holder for supporting the flap, power means for moving the holder between flap receiving and flap presenting positions, a pair of rotary cutters each comprising a trimming portion and a skiving portion, anvils associated respectively with the cutters and forming work receiving notches therewith, power means operative in timed relation with the holder for effecting relative movement of the holder on the one hand and the cutter and their associated anvils on the other hand generally lengthwise of the flap, and power means operative in timed relation with said holder and said second-named power means for imparting to the cutters and their associated anvils movement toward and away from one another.

14. In a machine of the class described, means for positioning a shoe having a heel breast covering flap, means for receiving said flap and moving it to and holding it in a position in which its lengthwise dimension is arranged at right angles to a heel seat of the shoe, means which comprises cutters and associated anvils movable lengthwise and widthwise of the flap toward the heel seat to trim the flap to an outline of the heel which is to be attached to the shoe.

15. In a machine of the class described, means for positioning a shoe having a heel breast covering flap, a support, a clamp movable with relation to the support, said support and clamp being movable between flap receiving and flap presenting positions, means for positioning the flap between the support and the clamp when said support and clamp are in their flap receiving positions, resilient means for operating the clamp to force the flap against the support, power means for moving the clamp and the support from the heel receiving position to the flap presenting position, a pair of rotary cutters, an anvil associated with each of the cutters, and means for moving the cutters and their associated anvils lengthwise and widthwise of the flap positioned by the support and the clamp in their flap presenting positions to cause the margin of the flap to be trimmed to the outline of a heel which is to be attached to the shoe.

16. In a machine of the class described, means for holding a heel breast covering flap in a predetermined position to be operated upon, a pair of cutters, means for moving the cutters generally lengthwise along opposite side margins of the flap, and mechanism operative in timed relation with the last-named means and comprising a follower for moving the cutters toward or away from each other as they move generally lengthwise of the side margins of the flap, said mechanism comprising a cam track which is adapted operatively to cooperate with said follower and is provided with a heel breast line controlling portion, means for effecting translatory movement of said cam in a predetermined path during each cycle of the machine, means for initially moving the heel breast line controlling portion of the track in a path extending transversely of said predetermined path and for simultaneously therewith swinging the cam track desired amounts substantially about said heel breast line controlling portion, and means for varying the amounts of swinging movement of the cam track in response respectively to given amounts of movement of the heel breast line controlling portion of the track in said predetermined path.

17. A machine of the class described, means for holding a heel breast covering flap in a predetermined position to be operated upon, a pair of rotary cutters, power means for rotating said cutters, means for moving the cutters generally lengthwise along opposite lateral margins of the flap, and mechanism operative in timed relation with said last-named means and comprising a follower for moving the cutters toward and away from each other as they move generally lengthwise of the lateral margins of the flap, said mechanism comprising a cam having a track which is adapted operatively to cooperate with said follower and is provided with a heel breast line controlling portion, power means for effecting translatory movement of said cam in a predetermined path during each cycle of the machine, means for initially moving the heel breast line controlling portion of the cam in a path extending transversely of said predetermined path and for simultaneously therewith swinging the cam track desired amounts substantially about said heel breast line controlling portion, means for varying the amounts of swinging movement of the cam track in response respectively to given amounts of movement of the heel breast line controlling portion of the track in said predetermined path, and means for initially swinging the cam and accordingly the track transversely of said predetermined path substantially about the heel breast line controlling portion of the track independently of movement of said heel breast line controlling portion in said predetermined path.

18. In a machine of the class described, means for positioning a shoe having a heel breast covering flap, a holder for locating said flap in a predetermined position to be operated upon, a pair of cutters, means for moving said cutters generally lengthwise of the flap, mechanism operated in timed relation with said second-named means for imparting to the cutters as they move generally lengthwise of said flap components of movement transversely of the flap, said mechanism comprising a carriage movable in a fixed path, a cam mounted on the carriage and having a face provided with an outer end controlling portion and a base end controlling portion, means for initially moving the base end controlling portion of the face of the cam on the carriage and transversely of said fixed path to a position in which the base end controlling portion of said face of the cam is suitably positioned to form a flap of suitable width to accommodate the base portion of the breast of a heel to be attached to the shoe, and means for initially swinging the cam into an adjusted position on the carrier transversely of said path substantially about its base end controlling portion to a position in which the outer end controlling portion of said face of the cam insures that the outer end portion of the flap shall have the same width as the top lift end of the breast of said heel.

19. In a machine of the class described, means for holding a heel breast covering flap in a predetermined position to be operated upon, a pair of cutters, means for moving the cutters generally lengthwise along opposite lateral margins of the flap, and mechanism operative in timed relation with said last-named means and comprising a follower for imparting to the cutters movement widthwise of the flap as they move generally lengthwise of the flap, said mechanism comprising a cam, a carriage adapted to support the cam and mounted for translatory movement in a fixed path, said cam during said translatory movement being adapted to bear against the follower to operate said mechanism, means for initially moving one portion of the cam to a predetermined position on said carriage in accordance with the desired width of the base end portion of the flap, and means responsive to movement of said last-named means for initially tilting the cam a predetermined amount on the carriage generally about said one portion of the cam in accordance with the desired withwise taper to be imparted to the breast of the flap.

20. In a machine of the class described, means for holding in a predetermined position a heel breast covering flap which is attached to an outsole of a shoe, a pair of flap trimming and skiving rotary cutters, power means for rotating said cutters, power means for moving the cutters generally lengthwise along the lateral margins of the flap and toward a heel breast line portion of said flap, power means for causing the cutters to be spaced predetermined distances apart as the heel breast line portion of the flap is being trimmed in accordance with the width of the lip portion of the breast of the heel which is to be attached to the shoe, means responsive to movement of said last-named means for causing the cutters to move away from each other predetermined amounts as they move toward the heel breast line of the flap, and means for varying the amounts that the cutters move apart as they move lengthwise of the flap toward the heel breast line thereof.

21. In a machine of the class described, means for holding in a predetermined position a heel breast covering flap which is attached to an outsole of a shoe, a pair of flap trimming rotary cutters, power means for rotating said cutters, anvils associated with said cutters, power means for moving the cutters and their associated anvils generally lengthwise along the lateral margins of the flap and toward a heel breast line of the flap, power means for causing the cutters and their associated anvils to be spaced predetermined distances apart as the heel breast line portion of the flap is being trimmed in accordance with the width of the breast of a heel which is to be attached to the shoe, means responsive to movement of said last-named means for causing the cutters and their associated anvils to move away from each other predetermined amounts as they move toward the heel breast line portion of the flap, and means for varying the amounts that the cutters move apart as they move lengthwise of the flap toward the heel breast line thereof.

22. In a flap trimming machine, means for securing a heel breast covering flap in a predetermined position, a pair of rotary cutters, means for rotating said cutters, means for moving the cutters generally lengthwise along the lateral margins of the flap, and mechanism responsive to movement of said second-named means and comprising a follower for imparting to the cutters movement toward or away from each other as they move generally lengthwise of the flap, said mechanism comprising a carriage mounted for translatory movement in a fixed path, a cam which is mounted and is movable into different positions on said carriage and which has a track provided with a heel breast line controlling portion and is adapted to engage said follower during movement of said carriage in said fixed path, means for effecting initial translatory movement of the heel breast line controlling portion of the cam track transversely of the path of movement of the carriage whereby to vary the distance between the cutters as they trim the heel breast line portion of the flap in accordance with the width of the lip portion of the breast of a heel to be attached to the shoe, and means responsive to the operation of said last-named means for effecting initial swinging adjustment of said track of the cam upon the carriage transversely of the path of movement of said carriage generally about said heel breast line controlling portion of said track whereby to vary the distances between the cutters as they move generally lengthwise of the flap in accordance with the desired widthwise taper of the flap to fit a particular heel to be attached to the shoe.

23. In a machine of the class described, means for holding a heel breast covering flap in a predetermined position to be operated upon, a pair of cutters, means for moving the cutters generally lengthwise along opposite lateral margins of the flap, and mechanism operative in timed relation with said last-named means and comprising a follower for imparting to the cutters movement toward and away from each other as they move generally lengthwise of said flap, said mechanism comprising a cam track which is adapted to control movement of said follower and is mounted for translatory movement in a fixed path and has spaced base end and outer end portions, means for initially swinging into a predetermined adjustable position the outer end portion of the track about the base end portion of the track and transversely of said fixed path in accordance with the size and style of heel which the flap is to be trimmed to accommodate, means for initially moving the base end portion of the track at right angles to said fixed path in accordance with the size of the base of the breast of the heel of a particular style which the flap is to accommodate, and means responsive to operation of said last-named means for initially swinging into predetermined adjustable positions the outer end portion of the track a predetermined amount about said base end portion of the track as said base end portion moves at right angles to said fixed path in accordance with the size of the heel which the flap is to accommodate.

24. In a machine of the class described, means for positioning a shoe having a heel breast covering flap, a holder adapted to present the flap in a predetermined position to be operated upon, cutters for trimming the flap thus presented to a predetermined outline to fit a heel which is to be attached to the shoe, means comprising slides for imparting to the cutters movement lengthwise of the flap, mechanism operative in timed relation with the slides for imparting to the cutters components of movement widthwise of the flap, a carriage, a cam mounted on the carriage and having a track provided with a heel breast line controlling portion, power means for forcing an element of said mechanism yieldingly against said track, means for operatively connecting the carriage to the slides for moving the carriage and accordingly the cam in a fixed rectilinear path, adjusting means for initially shifting a heel breast line controlling portion of said track into different operative positions at right angles to said rectilinear path whereby to vary the width between the cutters as they operate upon the heel breast line controlling portion of the flap in accordance with the width of the lip portion of the breast of the heel to be attached to the shoe, said cam and accordingly said track also being angularly adjustable into different operating positions about the heel breast line controlling portion of the track and transversely of said fixed rectilinear path in response to operation of said adjusting means in accordance with the desired widthwise taper to be imparted to the flap, and means for initially swinging into different operative positions on the carriage the cam and accordingly the track independently of the movement of said adjusting means whereby to insure that the cutters shall start their trimming cuts on the flap at suitable positions to insure that the outer end of the trimmed flap shall fit flush with the top lift receiving end of the breast of the heel which is to be attached to the shoe.

25. In a machine of the class described, means for holding a heel breast covering flap in a predetermined position to be operated upon, a pair of rotary cutters, means for rotating the cutters, means for moving the cutters generally lengthwise along opposite lateral margins of the flap, mechanism operative in timed relation with said last-named means for moving the cutters toward and away from each other as they move along the lateral margins of the flap whereby to trim said margins to a predetermined outline, means for initially setting said mechanism to control the distance between the cutters as they trim a base end portion of the flap, and means responsive to movement of said last-named means for initially setting said mechanism for causing the equal movements of the cutters toward and away from each other to vary as said cutters trim the remaining portions of the flap.

26. In a machine of the class described, means for holding a heel breast covering flap in a predetermined position to be operated upon, a pair of rotary cutters, bearing blocks for rotatably supporting said cutters, anvils supported by said blocks and forming V-shaped notches with the cutters, means for rotating the cutters in the blocks, means for moving the blocks and accordingly the cutters and the anvils in paths extending generally lengthwise of the flap, and means for moving the blocks and accordingly the cutters and the anvils predetermined distances toward and away from each other as they move in said paths, said anvils being mounted for translatory and pivotal adjustment on the blocks to vary the width and the angle of the V-shaped notch.

References Cited in the file of this patent

UNITED STATES PATENTS

| | | |
|---|---|---|
| 1,372,058 | Winkley | Mar. 22, 1921 |
| 2,692,999 | Hazelton | Nov. 2, 1954 |